United States Patent
Sakakibara

(10) Patent No.: US 9,444,360 B2
(45) Date of Patent: Sep. 13, 2016

(54) STATE QUANTITY DETECTION METHOD IN POWER CONVERTING APPARATUS AND POWER CONVERTING APPARATUS

(75) Inventor: Kenichi Sakakibara, Shiga (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 1392 days.

(21) Appl. No.: 12/863,974

(22) PCT Filed: Feb. 17, 2009

(86) PCT No.: PCT/JP2009/052700
§ 371 (c)(1),
(2), (4) Date: Jul. 21, 2010

(87) PCT Pub. No.: WO2009/110312
PCT Pub. Date: Sep. 11, 2009

(65) Prior Publication Data
US 2010/0308892 A1    Dec. 9, 2010

(30) Foreign Application Priority Data

Mar. 4, 2008  (JP) ................................. 2008-053459

(51) Int. Cl.
*H02M 5/458* (2006.01)
*H02M 7/155* (2006.01)
(Continued)

(52) U.S. Cl.
CPC ........... *H02M 5/4585* (2013.01); *H02M 5/451* (2013.01); *H02M 5/452* (2013.01); *H02M 5/4505* (2013.01); *H02M 7/1557* (2013.01)

(58) Field of Classification Search
CPC .. H02M 5/4505; H02M 5/451; H02M 5/452; H02M 5/4585; H02M 7/1557
USPC .................. 363/37, 79, 87, 89, 97, 129, 131
See application file for complete search history.

(56) References Cited

U.S. PATENT DOCUMENTS 6,134,126 A * 10/2000 Ikekame ................... H02J 3/01
  307/105
6,556,464 B2 * 4/2003 Sakai ................... H02M 1/4216
  363/132

(Continued)

FOREIGN PATENT DOCUMENTS

JP    3-230767 A    10/1991
JP    5-56682 A    3/1993

(Continued)

OTHER PUBLICATIONS

Koji, K. et al. "Improvement of Waveform for a Boost Type AC/DC/AC Direct Converter Focused on Input Current", 2007, Annual Conference of I.E.E. of Japan, Industry Applications Societ, pp. 1-279-1-282.

(Continued)

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A current-source converter includes high-arm side switching elements and low-arm side switching elements. A voltage between the DC power supply lines is detected as a line voltage of an input line, based on a conduction pattern of the high-arm side switching elements and the low-arm side switching elements.

20 Claims, 16 Drawing Sheets

(51) Int. Cl.
 *H02M 5/45* (2006.01)
 *H02M 5/451* (2006.01)
 *H02M 5/452* (2006.01)

(56) References Cited

U.S. PATENT DOCUMENTS

| | | | | |
|---|---|---|---|---|
| 6,839,249 | B2* | 1/2005 | Kalman | H02M 7/4826 |
| | | | | 363/35 |
| 7,129,677 | B2* | 10/2006 | Fu | H02M 7/219 |
| | | | | 363/127 |
| 7,791,309 | B2* | 9/2010 | Hwang | H02P 1/30 |
| | | | | 318/430 |
| 8,169,180 | B2* | 5/2012 | Hwang | F24F 11/0009 |
| | | | | 318/400.01 |
| 2002/0154526 | A1 | 10/2002 | Sakai et al. | |
| 2006/0044848 | A1 | 3/2006 | Suzuki et al. | |
| 2009/0135630 | A1* | 5/2009 | Suzuki | H02M 5/4585 |
| | | | | 363/37 |
| 2010/0244570 | A1* | 9/2010 | Sakakibara | H02M 5/271 |
| | | | | 307/75 |

FOREIGN PATENT DOCUMENTS

| | | |
|---|---|---|
| JP | 9-28039 A | 1/1997 |
| JP | 11-27865 A | 1/1999 |
| JP | 2002-315343 A | 10/2002 |
| JP | 2005-137137 A | 5/2005 |
| JP | 2006-67754 A | 3/2006 |
| JP | 2007-312490 A | 11/2007 |
| JP | 2007-312589 A | 11/2007 |
| JP | 2007-312590 A | 11/2007 |
| JP | 2007-312598 A | 11/2007 |

OTHER PUBLICATIONS

Takeshita, T et al. "PWM Scheme for Current Source Three-Phase Inverters and Converters", Journal of IEEEJ, D, vol. 116, No. 1, pp. 106-107, 1996.

Wei L. et al. "A Novel Matrix Converter Topology With Simple Commutation", IEEE ISA2001, vol. 3, pp. 1-6, 2001.

* cited by examiner

F I G . 3
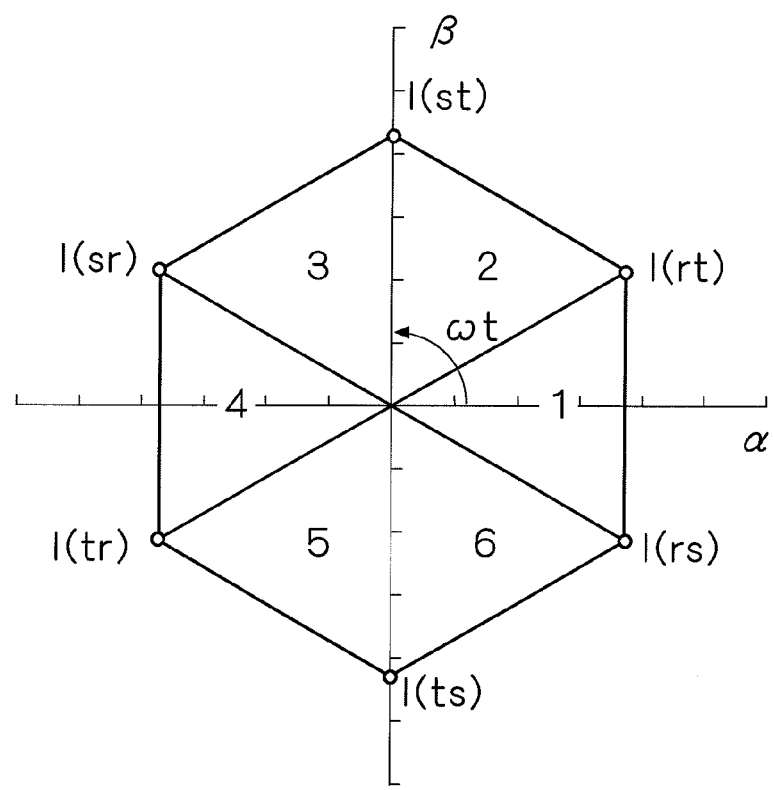

F I G . 5
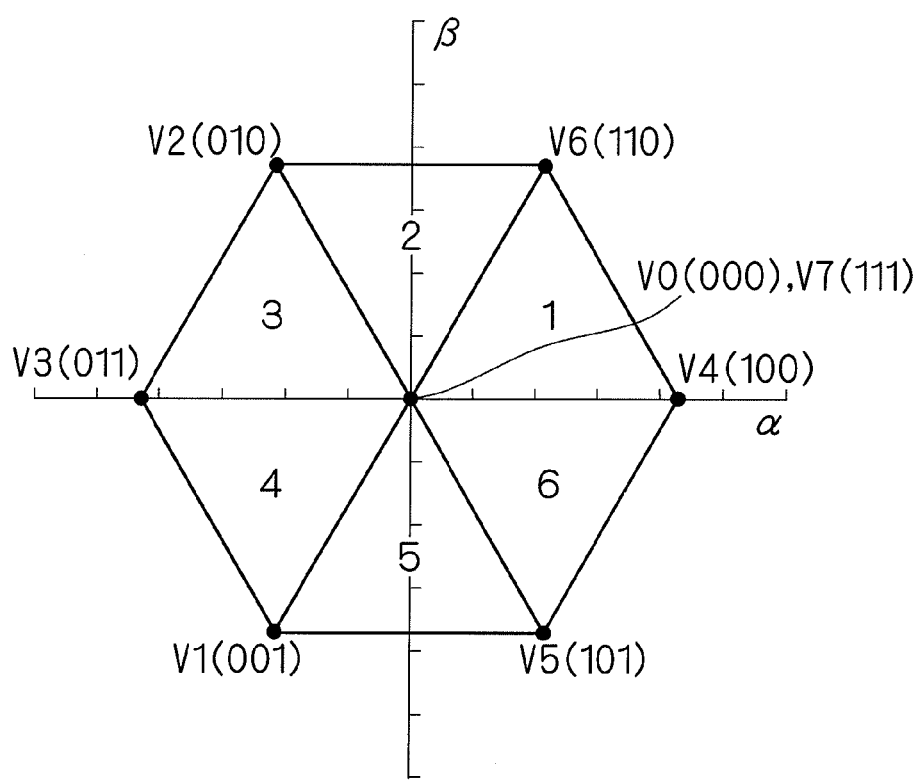

F I G . 6
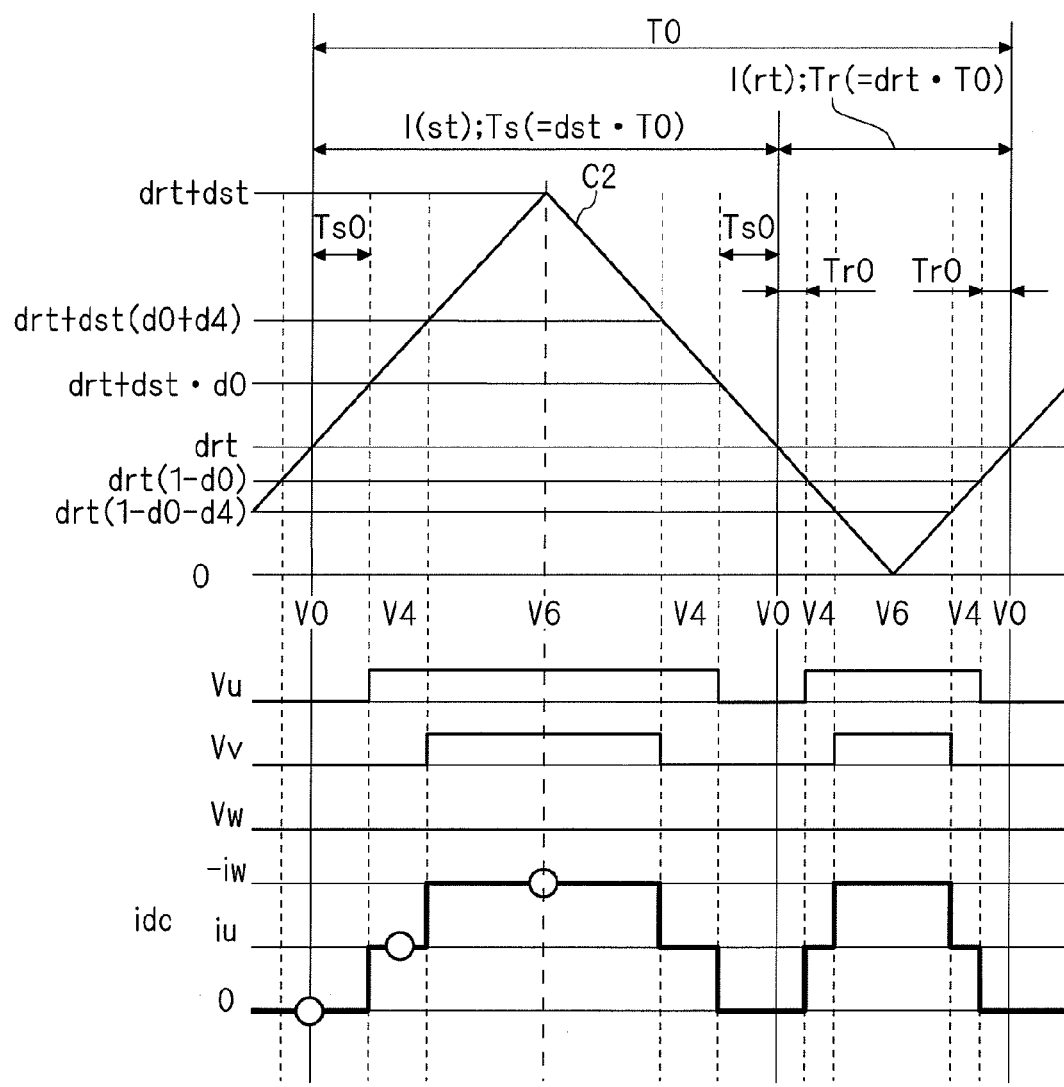

F I G . 7
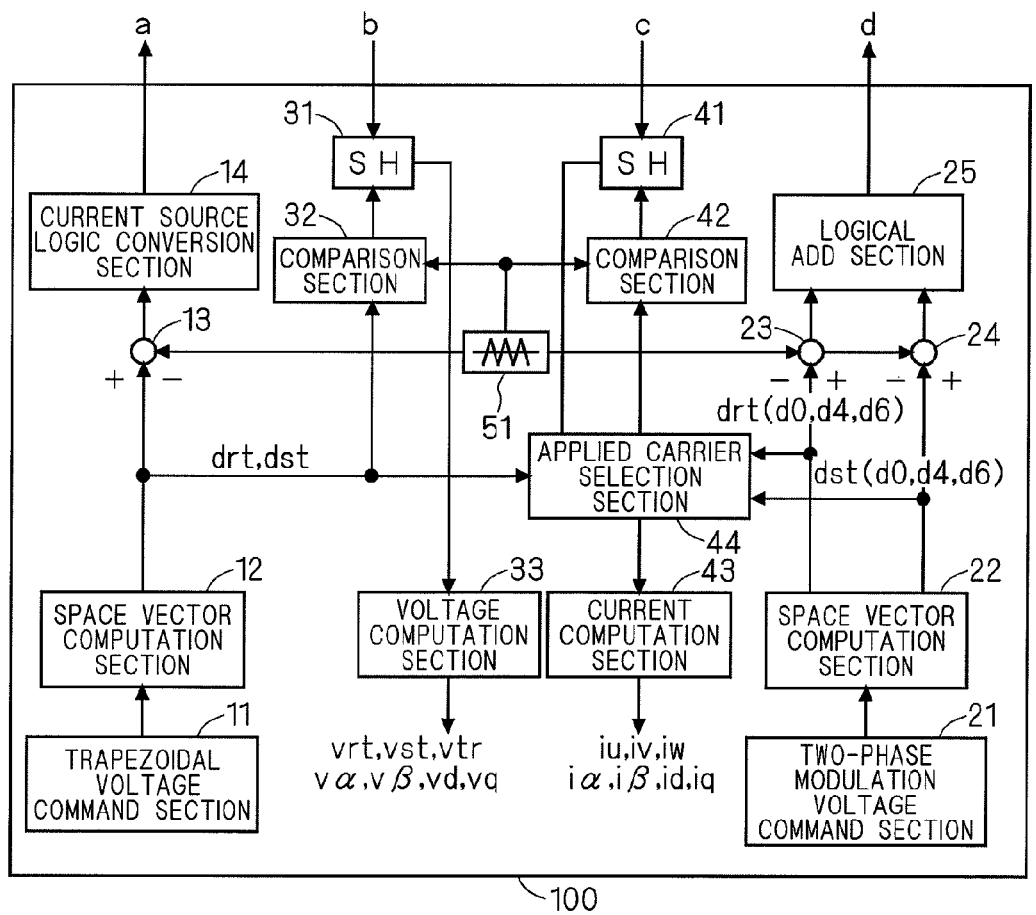

F I G. 1 5
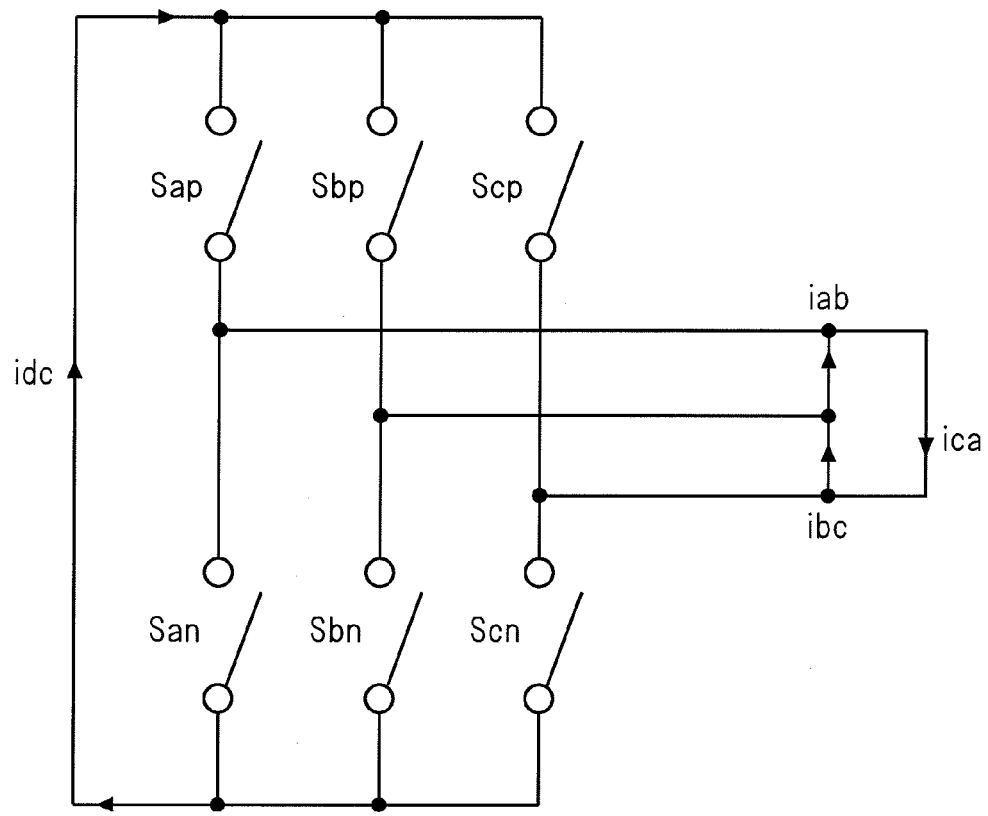

F I G . 2 3
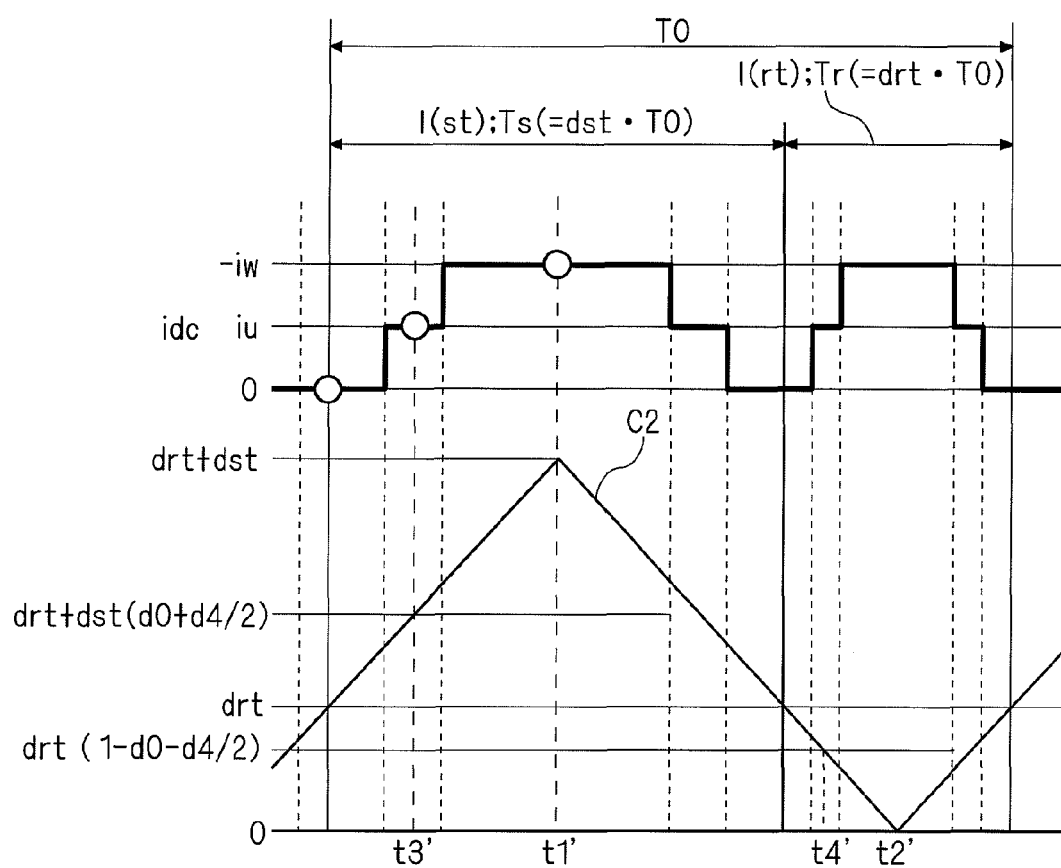

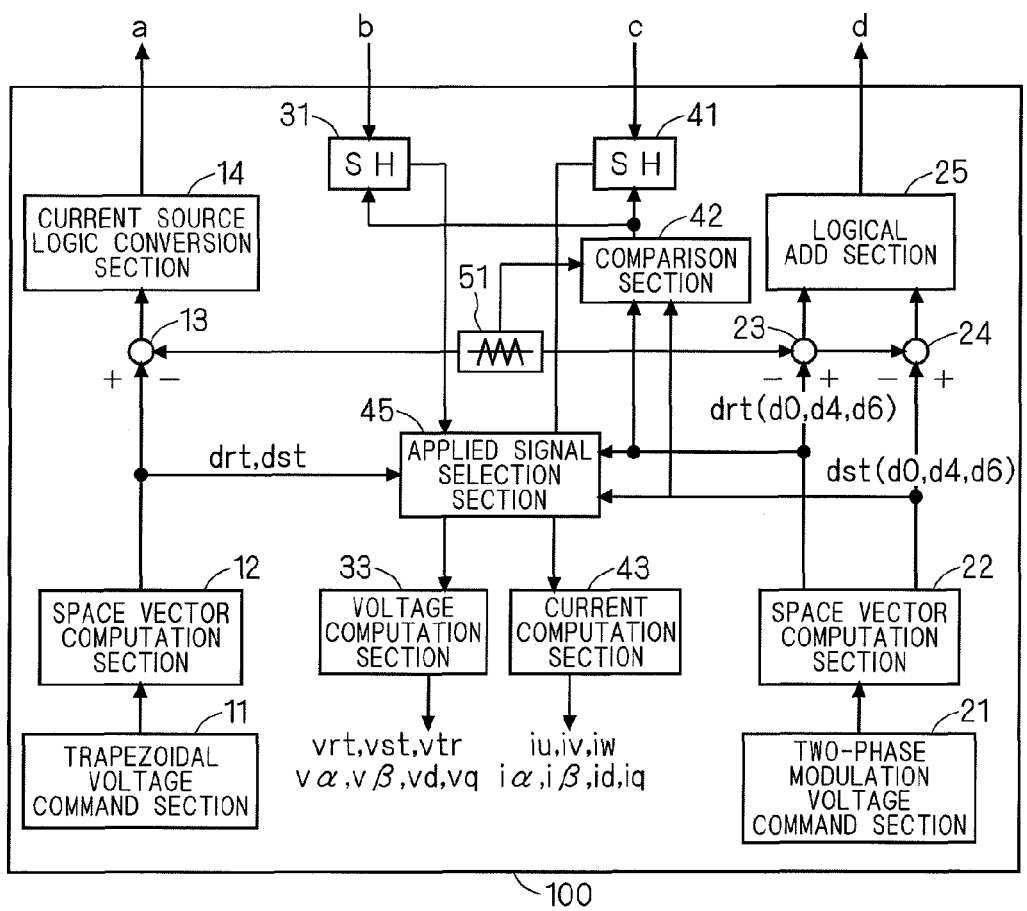
F I G . 2 4

US 9,444,360 B2

STATE QUANTITY DETECTION METHOD IN POWER CONVERTING APPARATUS AND POWER CONVERTING APPARATUS

TECHNICAL FIELD

The present invention relates to a state quantity detection method in a power converting apparatus, and the power converting apparatus, and for example, relates to a direct power converting apparatus having no power storage means between a converter and an inverter.

BACKGROUND ART

Japanese Patent Application Laid-Open No. 3-230767 (1991) discloses a technique of detecting a current in an inverter which converts a DC voltage applied between two DC power supply lines into a three-phase AC voltage. A smoothing capacitor is connected between the DC power supply lines. A shunt resistor is connected to the DC power supply line, at an inverter side relative to the smoothing capacitor. A current flowing in the shunt resistor is detected based on a voltage vector of a voltage outputted by the inverter, and a phase current is obtained by computation using the detected current value.

To operate a power converting apparatus so as to bring an input power factor closer to 1, a configuration is generally adopted in which a PWM converter is connected in series with an inverter.

Japanese Patent Application Laid-Open No. 2002-315343 discloses a technique of detecting a current in a PWM converter which converts a three-phase AC voltage inputted from a power source via an input line into a DC voltage and outputs the resultant DC voltage to between DC power supply lines. A smoothing capacitor is connected between the DC power supply lines. A shunt resistor is connected to the DC power supply line, at a PWM converter side relative to the smoothing capacitor. A current flowing in the shunt resistor is detected based on a voltage vector of a voltage outputted by the PWM converter, and a phase current of an input line is obtained by computation using the detected current value.

The phase current of the input line is used for the control of the PWM converter. Such a control is performed by using only phase information of the three-phase AC voltage. Therefore, it is necessary to detect the amplitude of a power source, in order to monitor a malfunction of the power source such as an instantaneous power failure and a voltage drop. For example, a voltage between the DC power supply lines is detected.

Japanese Patent Application Laid-Open No. 5-056682 (1993), L. wei, T. A. Lipo, "A Novel Matrix Converter Topology with Simple Commutation", IEEE ISA2001, vol. 3, pp. 1749-1754, 2001, Koji Kato, Jun-ichi Itoh, "Improvement of Waveform for Step-up AC/DC/AC Direct Power Converter", 2007 Annual Conference of I.E.E. of Japan, Industry Applications Society, pp. 1 to 31, pp. 1-279 to 282 and Takaharu Takeshita, Koji Toyama, Nobuyuki Matsui, "PWM Scheme for Current Source Three-Phase Inverters and Converters", Journal of IEEJ, D, vol. 116, No. 1, pp. 106-107, 1996 disclose techniques pertinent to the present invention.

DISCLOSURE OF THE INVENTION

Problems to be Solved by the Invention

If the inverter disclosed in Japanese Patent Application Laid-Open No. 3-230767 (1991) and the PWM converter disclosed in Japanese Patent Application Laid-Open No. 2002-315343 are connected in series with each other, two current detection circuits which detect phase currents of the PWM converter and the inverter, respectively, are provided. For monitoring a malfunction of a power source, a method of detecting a voltage of a smoothing capacitor is known as disclosed in Japanese Patent Application Laid-Open No. 5-056682 (1993). Accordingly, two current detection circuits and one voltage detection circuit are necessary, and there has been a limit in simplification of a configuration. The voltage detection is at such a level that an increase and a decrease of the amplitude of a power source can be detected, and there has been a problem of a detection accuracy.

Therefore, an object of the present invention is to provide a state quantity detection method for detecting a state quantity in a power converting apparatus with a simple configuration and with a high accuracy, and to provide the power converting apparatus.

Means for Solving the Problems

In a first aspect of a state quantity detection method in a power converting apparatus according to the present invention, a power converting apparatus includes: a plurality of input lines (ACLr, ACLs, ACLt) to which a multi-phase voltage is inputted; first and second DC power supply lines (L1, L2); and a current-source converter (10) including a plurality of high-arm side switching elements (Srp, Ssp, Stp) and a plurality of low-arm side switching elements (Srn, Ssn, Stn). Each of the high-arm side switching elements (Srp, Ssp, Stp) is connected between each of the input lines and the first DC power supply line, and each of the low-arm side switching elements (Srn, Ssn, Stn) is connected between each of the input lines and the second DC power supply line. Based on an instantaneous conduction pattern (I(rs)) of the high-arm side switching elements and the low-arm side switching elements, a voltage (Vdc) between the first and second DC power supply lines is detected as a line voltage (Vrs) between the input lines.

In a second aspect, a state quantity detection method in a power converting apparatus according to the present invention is the state quantity detection method in the power converting apparatus according to the first aspect. The power converting apparatus further includes: a plurality of output lines (ACLu, ACLv, ACLw); and a voltage-source inverter (20) including a plurality of second high-arm side switching elements (Sup, Svp, Swp) and a plurality of second low-arm side switching elements (Sun, Svn, Swn). Each of the second high-arm side switching elements (Sup, Svp, Swp) is connected between each of the output lines and the first DC power supply line (L1), and each of the second low-arm side switching elements (Sun, Svn, Swn) is connected between each of the output lines and the second DC power supply line (L2). The power converting apparatus is a direct power converting apparatus in which power storage means is not provided in the first and second DC power supply lines. The current-source converter (10) and the voltage-source inverter are operated in synchronization with each other, and a current (idc) flowing in the first and second DC power supply lines is detected as a line current (iu) of the output line, based on a second instantaneous conduction pattern (V4) of the second high-arm side switching elements and the second low-arm side switching elements.

In a third aspect, a state quantity detection method in a power converting apparatus according to the present invention is the state quantity detection method in the power converting apparatus according to the second aspect. The power converting apparatus further includes: a carrier generation section (51) that generates a carrier; a converter gate signal generation section (11 to 14) that gives a first switch signal for controlling a switching operation of the high-arm side switching elements and the low-arm side switching elements; and an inverter gate signal generation section (21 to 25) that gives a second switch signal for controlling a switching operation of the second high-arm side switching elements and the second low-arm side switching elements. The current-source converter (10) performs a commutation based on the first switch signal, when a value of the carrier is a reference value (drt) for dividing a range between a minimum value and a maximum value of the carrier at a ratio between a first value (drt) and a second value (dst). The voltage-source inverter (20) adopts the second conduction pattern (V0 to V7) based on the second switch signal, in each of two cycles of a first carrier cycle (dst·Ts) and a second carrier cycle (drt·Ts) which are alternately recognized with a boundary therebetween being at a time point at which the carrier has the reference value. The current (idc) is detected as the line current (iu), based on the second instantaneous conduction pattern (V4) in the longer one of the first carrier cycle and the second carrier cycle.

In a fourth aspect, a state quantity detection method in a power converting apparatus according to the present invention is the state quantity detection method in the power converting apparatus according to the first or second aspect. The power converting apparatus further includes: a carrier generation section (51) that generates a carrier having a single triangular wave shape; and a converter gate signal generation section (11 to 14) that gives a switch signal for controlling a switching operation of the high-arm side switching elements and the low-arm side switching elements. The current-source converter (10) performs a commutation based on the switch signal, when a value of the carrier is a reference value (drt) for dividing a range between a minimum value and a maximum value of the carrier at a ratio between a first value (drt) and a second value (dst). When the value of the carrier is the maximum value or the minimum value, the voltage (Vdc) is sampled/held, and detected.

In a fifth aspect, a state quantity detection method in a power converting apparatus according to the present invention is the state quantity detection method in the power converting apparatus according to the first or second aspect. The plurality of input lines (ACLr, ACLs, ACLt) include three input lines. The power converting apparatus further includes: a carrier generation section (51) that generates a carrier; and a converter gate signal generation section (11 to 14) that gives a switch signal for controlling a switching operation of the high-arm side switching elements and the low-arm side switching elements. The current-source converter (10) performs a commutation based on the switch signal, when a value of the carrier is a reference value (drt) for dividing a range between a minimum value and a maximum value of the carrier at a ratio between a first value (drt) and a second value (dst). In one cycle of the carrier, the voltage (Vdc) is detected to detect two of line voltages (Vrs, Vsr, Vst, Vts, Vtr, Vrt) between ones of the input lines, and the other one of the line voltages is calculated based on the detected two line voltages.

In a sixth aspect, a state quantity detection method in a power converting apparatus according to the present invention is the state quantity detection method in the power converting apparatus according to the third aspect. The plurality of output lines (ACLu, ACLv, ACLw) include three output lines. In one cycle of the carrier, the current (idc) is detected to detect two of line currents (iu, iv, iw, −iu, −iv, −iw) of the output lines, and the other one of the line currents is calculated based on the detected two line currents.

In a seventh aspect, a state quantity detection method in a power converting apparatus according to the present invention is the state quantity detection method in the power converting apparatus according to first to sixth aspects. The detected line voltage is converted into a voltage value in mutually orthogonal α-axis and β-axis of a stationary coordinate system, or into a voltage value in mutually orthogonal d-axis and q-axis in a rotating coordinate system.

In an eighth aspect, a state quantity detection method in a power converting apparatus according to the present invention is the state quantity detection method in the power converting apparatus according to any one of the second, third, and sixth aspects. The detected line current is converted into a current value in mutually orthogonal α-axis and β-axis of a stationary coordinate system, or into a current value in mutually orthogonal d-axis and q-axis in a rotating coordinate system.

In a first aspect of a power converting apparatus according to the present invention, a power converting apparatus includes: a plurality of input lines (ACLr, ACLs, ACLt) to which a multi-phase voltage is inputted; first and second DC power supply lines (L1, L2); a current-source converter (10) including a plurality of high-arm side switching elements (Srp, Ssp, Stp) and a plurality of low-arm side switching elements (Srn, Ssn, Stn), each of the high-arm side switching elements (Srp, Ssp, Stp) being connected between each of the input lines and the first DC power supply line, each of the low-arm side switching elements (Srn, Ssn, Stn) being connected between each of the input lines and the second DC power supply line; and a line voltage detection section (R1, 31 to 33) that detects a voltage (Vdc) between the first and second DC power supply lines as a line voltage (Vrs) between the input lines, based on an instantaneous conduction pattern (I(rs)) of the high-arm side switching elements and the low-arm side switching elements.

In a second aspect, a power converting apparatus according to the present invention is the power converting apparatus according to the first aspect. The power converting apparatus further includes: a plurality of output lines (ACLu, ACLv, ACLw); a voltage-source inverter (20) including a plurality of second high-arm side switching elements (Sup, Svp, Swp) and a plurality of second low-arm side switching elements (Sun, Svn, Swn), each of the second high-arm side switching elements (Sup, Svp, Swp) being connected between each of the output lines and the first DC power supply line (L1), each of the second low-arm side switching elements (Sun, Svn, Swn) being connected between each of the output lines and the second DC power supply line (L2); a synchronization modulation section (11 to 14, 21 to 25, 51) that operates the current-source converter and the voltage-source inverter in synchronization with each other; and a line current detection section (R3, 41 to 45) that detects a current (idc) flowing in the first and second DC power supply lines as a line current (iu) of the output line, based on a second conduction pattern (V4) of the second high-arm side switching elements and the second low-arm side switching elements. The power converting apparatus is a direct power converting apparatus in which power storage means is not provided in the first and second DC power supply lines.

In a third aspect, a power converting apparatus according to the present invention is the power converting apparatus according to the second aspect. The synchronization modulation section includes: a carrier generation section (51) that generates a carrier; a converter gate signal generation section (11 to 14) that gives a first switch signal for controlling a switching operation of the high-arm side switching elements and the low-arm side switching elements; and an inverter gate signal generation section (21 to 25) that gives a second switch signal for controlling a switching operation of the second high-arm side switching elements and the second low-arm side switching elements. The current-source converter (10) performs a commutation based on the first switch signal, when a value of the carrier is a reference value (drt) for dividing a range between a minimum value and a maximum value of the carrier at a ratio between a first value (drt) and a second value (dst). The voltage-source inverter (20) adopts the second conduction pattern (V0 to V7) based on the second switch signal, in each of two cycles of a first carrier cycle (dst·Ts) and a second carrier cycle (drt·Ts) which are alternately recognized with a boundary therebetween being at a time point at which the carrier has the reference value. The line current detection section (R3, 41 to 45) detects the current (idc) as the line current (iu), based on the second instantaneous conduction pattern (V4) in the longer one of the first carrier cycle and the second carrier cycle.

In a fourth aspect, a power converting apparatus according to the present invention is the power converting apparatus according to the first or second aspect. The power converting apparatus further includes: a carrier generation section (51) that generates a carrier having a single triangular wave shape; and a converter gate signal generation section (11 to 14) that gives a switch signal for controlling a switching operation of the high-arm side switching elements and the low-arm side switching elements. The current-source converter (10) performs a commutation based on the switch signal, when a value of the carrier is a reference value (drt) for dividing a range between a minimum value and a maximum value of the carrier at a ratio between a first value (drt) and a second value (dst). The line voltage detection section (31 to 33) samples/holds and detects the voltage (Vdc), when the value of the carrier is the maximum value or the minimum value.

In a fifth aspect, a power converting apparatus according to the present invention is the power converting apparatus according to the first or second aspect. The plurality of input lines (ACLr, ACLs, ACLt) include three input lines. The power converting apparatus further includes: a carrier generation section (51) that generates a carrier; and a converter gate signal generation section (11 to 14) that gives a switch signal for controlling a switching operation of the high-arm side switching elements and the low-arm side switching elements. The current-source converter (10) performs a commutation, when a value of the carrier is a reference value (drt) for dividing a range between a minimum value and a maximum value of the carrier at a ratio between a first value (drt) and a second value (dst). In one cycle of the carrier, the line voltage detection section (R1, R2, 31 to 33) detects the voltage (Vdc) to detect two of line voltages (Vrs, Vsr, Vst, Vts, Vtr, Vrt) between ones of the input lines, and calculates the other one of the line voltages based on the detected two line voltages.

In a sixth aspect, a power converting apparatus according to the present invention is the power converting apparatus according to the third aspect. The plurality of output lines (ACLu, ACLv, ACLw) include three output lines. In one cycle of the carrier, the line current detection section (R3, 41 to 45) detects the current (idc) to detect two of line currents (iu, iv, iw) of the output lines, and calculates the other one of the line currents based on the detected two line currents.

In a seventh aspect, a power converting apparatus according to the present invention is the power converting apparatus according to any one of the first to sixth aspects. The line voltage detection section (R1, R2, 31 to 33) converts the line voltage into a voltage value in mutually orthogonal $\alpha$-axis and $\beta$-axis of a stationary coordinate system, or into a voltage value in mutually orthogonal d-axis and q-axis in a rotating coordinate system.

In an eighth aspect, a power converting apparatus according to the present invention is the power converting apparatus according to any one of the second, third, and sixth aspects. The line current detection section (R3, 41 to 45) converts the line current into a current value in mutually orthogonal $\alpha$-axis and $\beta$-axis of a stationary coordinate system, or into a current value in mutually orthogonal d-axis and q-axis in a rotating coordinate system.

Effects of the Invention

According to the first aspect of the state quantity detection method in the power converting apparatus according to the present invention, and the first aspect of the power converting apparatus according to the present invention, to detect a line voltage between ones of the plurality of input lines, it suffices that only a voltage between the first and second DC power supply lines is detected. This enables amplitude information to be obtained with a high accuracy and enables detection of an instantaneous waveform of an input voltage, as compared with the method of obtaining the amplitude information by detecting a voltage between both ends of a smoothing capacitor to thereby detect a DC voltage as disclosed in Japanese Patent Application Laid-Open No. 5-056682 (1993). Moreover, it is apparent that the detection can be performed with a simpler configuration than in a case where a voltage is directly detected in ones of the plurality of input lines.

According to the second aspect of the state quantity detection method in the power converting apparatus according to the present invention, and the second aspect of the power converting apparatus according to the present invention, the current-source converter and the voltage-source inverter are operated in synchronization with each other, and therefore a line voltage of the input line and a line current of the output line can be detected at the same timing.

According to the third aspect of the state quantity detection method in the power converting apparatus according to the present invention, and the third aspect of the power converting apparatus according to the present invention, the current is detected in the longer one of the two carrier cycles. Therefore, even if one of the carrier cycles becomes short to disable a current detection, a current can be detected in the other carrier cycle.

According to the fourth aspect of the state quantity detection method in the power converting apparatus according to the present invention, and the fourth aspect of the power converting apparatus according to the present invention, a time when the value of the carrier is the maximum value and the minimum value is located at the center of a time period from when the value of the carrier has the reference value to when the value of the carrier has the reference value again. In this time period, no commutation is performed, and therefore the switching operation of the high-arm side switching elements and the low-arm side switching elements is not performed. A voltage can be sampled/held at the center of a time period in which the high-arm side switching elements and the low-arm side switching elements maintain a predetermined conduction pattern. Thus, even if this time period is shortened, a stable voltage value can be detected.

According to the fifth aspect of the state quantity detection method in the power converting apparatus according to the present invention, and the fifth aspect of the power converting apparatus according to the present invention, all of the line voltages between ones of the input lines can be recognized.

According to the sixth aspect of the state quantity detection method in the power converting apparatus according to the present invention, and the sixth aspect of the power converting apparatus according to the present invention, all of the line currents of the output lines can be recognized.

According to the seventh aspect of the state quantity detection method in the power converting apparatus according to the present invention, and the seventh aspect of the power converting apparatus according to the present invention, the voltage value in the α-axis and the β-axis, or in the d-axis and the q-axis, can be obtained. This voltage value can be used for controlling the direct power converting apparatus.

According to the eighth aspect of the state quantity detection method in the power converting apparatus according to the present invention, and the eighth aspect of the power converting apparatus according to the present invention, the current value in the α-axis and the β-axis, or in the d-axis and the q-axis, can be obtained. This current value can be used for controlling the direct power converting apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing current vectors;

FIG. 5 is a diagram showing voltage vectors;

FIG. 6 is a timing chart showing a switching operation of a voltage-source inverter;

FIG. 7 is a diagram showing an exemplary conceptual configuration of a control section which controls the direct power converting apparatus;

FIG. 15 is a diagram showing a conceptual configuration of an inverter;

FIG. 23 is a timing chart for showing a sampling timing; and

FIG. 24 is a diagram showing another exemplary conceptual configuration of the control section which controls the direct power converting apparatus.

BEST MODE FOR CARRYING OUT THE INVENTION

First Embodiment

Figure 1:
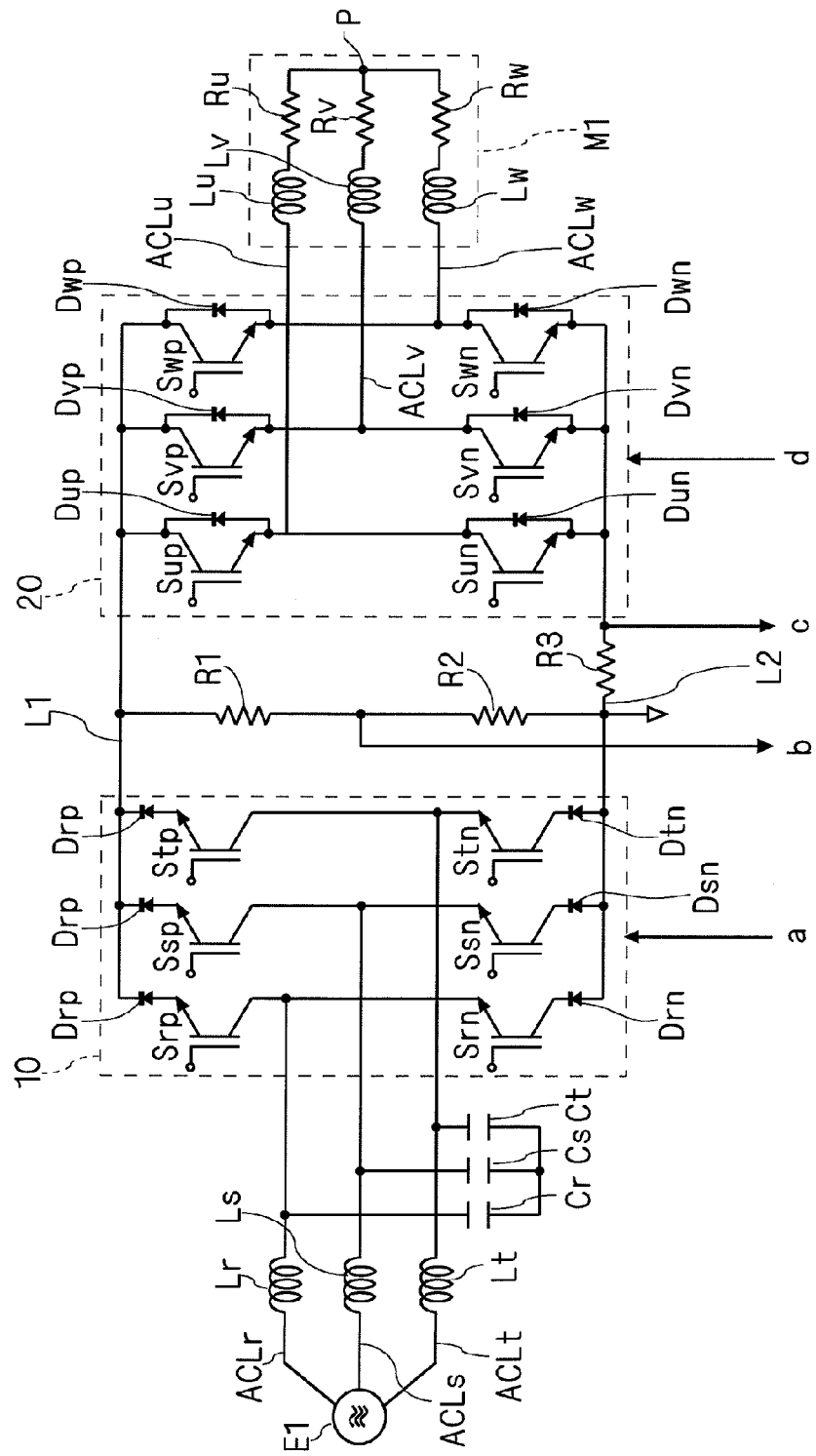
FIG. 1 is a diagram showing an exemplary conceptual configuration of a direct power converting apparatus.

FIG. 1 shows an exemplary conceptual configuration of a direct power converting apparatus according a first embodiment. The direct power converting apparatus includes a multi-phase power source E1, input lines ACLr, ACLs, ACLt, reactors Lr, Ls, Lt, capacitors Cr, Cs, Ct, a current-source converter 10, DC power supply lines L1, L2, resistors R1, R2, a shunt resistor R3, a voltage-source inverter 20, output lines ACLu, ACLv, ACLw, and a multi-phase motor M1.

The multi-phase power source E1 is, for example, a three-phase AC power source, and outputs three-phase AC voltages to between one of the input lines ACLr, ACLs, ACLt.

The reactors Lr, Ls, Lt are provided on the input lines ACLr, ACLs, ACLt, respectively.

The capacitors Cr, Cs, Ct are provided between ones of the respective input lines ACLr, ACLs, ACLt, by being Y-connected with one another, for example. Specifically, the capacitors Cr, Cs are connected in series between the input lines ACLr, ACLs. The capacitors Cs, Ct are connected in series between the input lines ACLs, ACLt. The capacitors Ct, Cr are connected in series between the input lines ACLt, ACLr. They are provided at the input side of the current-source converter 10, and function as a voltage source. It can be recognized that the capacitors Cr, Cs, Ct cooperate with the reactors Lr, Ls, Lt, respectively, to form a carrier current component removal filter for removing a carrier current component.

The current-source converter 10 has high-arm side switching elements Sxp (here, x represents r, s, t, hereinafter the same shall apply), low-arm side switching elements Sxn, and fast diodes Dxp, Dxn. The high-arm side switching element Sxp is an IGBT for example, and connected between the input line ACLx and the DC power supply line L1. The low-arm side switching element Sxn is an IGBT for example, and connected between the input line ACLx and the DC power supply line L2. The fast diode Dxp is connected in series with the high-arm side switching element Sxp, while an anode of the fast diode Dxp is at the input line ACLx side and a cathode thereof is at the DC power supply line L1 side. The fast diode Dxn is connected in series with the low-arm side switching element Sxn, while an anode of the fast diode Dxn is at the DC power supply line L2 side and a cathode thereof is at the input line ACLx side.

The voltage-source inverter 20 has high-arm side switching elements Syp (here, y represents u, v, w, hereinafter the same shall apply), low-arm side switching elements Syn, and free-wheeling diodes Dyp, Dyn. The high-arm side switching element Syp is an IGBT for example, and connected between the output line ACLy and the DC power supply line L1. The low-arm side switching element Syn is an IGBT for example, and connected between the output line ACLy and the DC power supply line L2. The free-wheeling diode Dyp is connected in parallel with the high-arm side switching element Syp, while an anode of the free-wheeling diode Dyp is at the output line ACLy side and a cathode thereof at the DC power supply line L1 side. The free-wheeling diode Dyn is connected in parallel with the low-arm side switching element Syn, while an anode of the free-wheeling diode Dyn is at the DC power supply line L2 side and a cathode thereof at the output line ACLy side.

In the following description, the high-arm side switching element and the low-arm side switching element are also simply called switching elements.

The resistors R1, R2 are connected in series with each other between the DC power supply lines L1, L2. The resistors R1, R2 are resistors for detecting a DC voltage Vdc between the DC power supply lines L1, L2. It is not always necessary to provide both of the resistors R1, R2, in order to detect the DC voltage Vdc. For example, a voltage between the DC power supply lines L1, L2 may be directly detected, and the voltage may be transformed by an amplifier of a control circuit, or the like.

The shunt resistor R3 is provided on the DC power supply line L2, at the voltage-source inverter 20 side relative to the resistors R1, R2. The shunt resistor R3 is a resistor for detecting a DC current idc flowing in the DC power supply lines L1, L2. The shunt resistor R3 may be provided on the DC power supply line L1, as long as the shunt resistor R3 is at the voltage-source inverter 20 side relative to the resistors R1, R2.

The multi-phase motor M1 indicates only an inductive element of a three-phase AC motor, for example. In FIG. 1, an inductance component and a resistance component thereof are represented by coils Lu, Lv, Lw and resistors Ru, Rv, Rw, respectively. The coils Lu, Lv, Lw are connected in series with the resistors Ru, Rv, Rw, respectively. One ends of the respective coils Lu, Lv, Lw at the side opposite to the resistors Ru, Rv, Rw are connected between the switching elements Sup, Sun, between the switching elements Svp, Svn, and between the switching elements Swp, Swn, respectively. One ends of the respective resistors Ru, Rv, Rw at the side opposite to the coils Lu, Lv, Lw are commonly connected at a neutral point P. Here, since the coils Lu, Lv, Lw and the resistors Ru, Rv, Rw merely equivalently represent the inductance component and the resistance component of the multi-phase motor M1, respectively, the positions of the resistor Ry and the coil Ly in the series connection between the neutral point P and the output line ACLy may be exchanged.

As described above, in this direct power converting apparatus, power conversion is performed by using an inductive element of a load as a current source, and therefore power storage means such as a capacitor and a coil is not provided between the DC power supply lines L1, L2.

In such a direct power converting apparatus, switching control methods for the current-source converter 10 and the voltage-source inverter 20 will be firstly described, and then a state quantity detection method will be described. Herein, the term "state quantity" means a current value or a voltage value.

Figure 2:
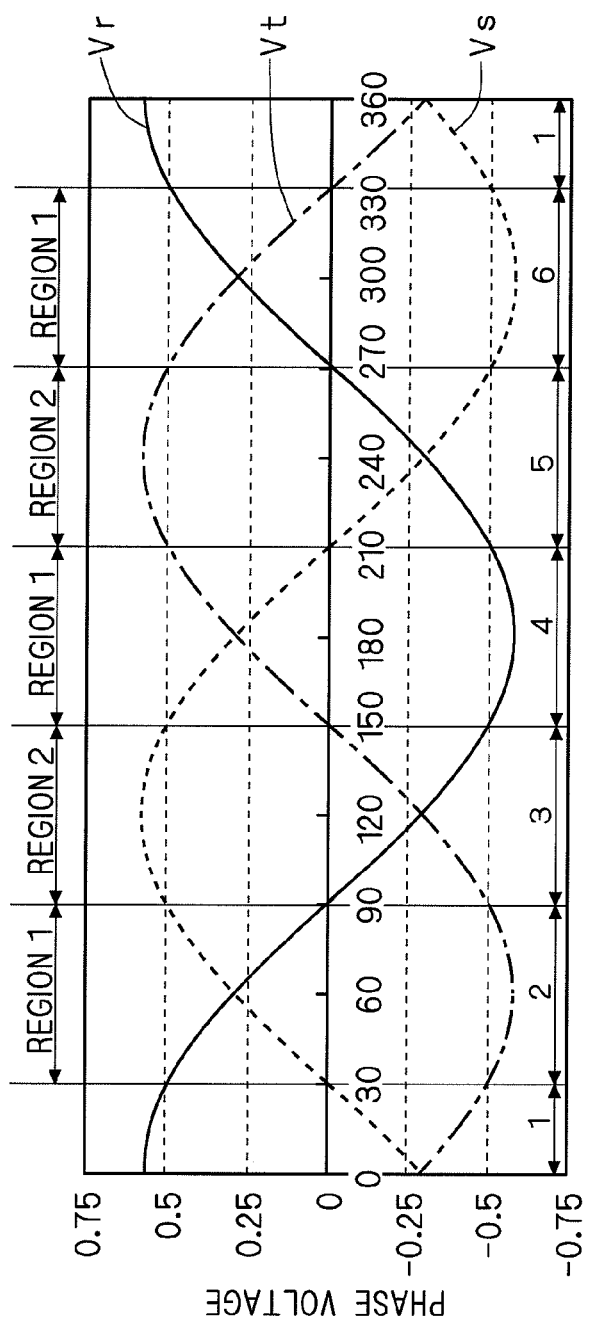
FIG. 2 is a graph showing phase voltages.

A switching operation of the switching elements Sxp, Sxn in the current-source converter 10 will be described. FIG. 2 shows phase voltages Vr, Vs, Vt applied to the input lines ACLr, ACLs, ACLt, respectively. As shown in FIG. 2, a region 1 and a region 2 alternately and repeatedly appear at every 60-degrees phase angle. In the region 1, one of the phase voltages Vr, Vs, Vt has the negative polarity and the other two have the positive polarity. In the region 2, one of the phase voltages Vr, Vs, Vt has the positive polarity, and the other two have the negative polarity. Thus, in the region 1, the low-arm side switching element corresponding to the one phase having the negative polarity is rendered conducting, and the high-arm side switching elements corresponding to the other two phases are rendered conducting exclusively from each other. In the region 2, the high-arm side switching element corresponding to the one phase having the positive polarity is rendered conducting, and the low-arm side switching elements corresponding to the other two phases are rendered conducting exclusively from each other.

For example, in a region corresponding to a phase angle of 30 to 90 degrees, only the phase voltage Vt in the t-phase has the negative polarity, and the phase voltages Vr, Vs in the r-phase and the s-phase have the positive polarity. In this region, the low-arm side switching element Stn corresponding to the t-phase is rendered conducting, and the high-arm side switching elements Sip, Ssp corresponding to the r-phase and the s-phase are rendered conducting alternately and exclusively from each other.

FIG. 3 is a diagram showing current vectors. A trajectory of a current vector of a current outputted from the current-source converter 10 by the above-described switching operation has a hexagonal shape whose vertexes are represented by current vectors I(rs), I(rt), I(st), I(sr), I(tr), I(ts). The numerals shown at the lower part of the graph of FIG. 2 indicate current modes corresponding to the current vectors of FIG. 3.

Table 1 shows conduction patterns in the current-source converter 10 each corresponding to each of the current vectors I(rs), I(rt), I(st), I(sr), I(tr), I(ts). For example, referring to FIGS. 2 and 3, in the current mode 2 (the region corresponding to a phase angle of 30 degrees to 90 degrees), a conduction pattern (current vector I(rt) in Table 1) in which only the high-arm side switching element Srp and the low-arm side switching element Stn are rendered conducting, and a conduction pattern (current vector I(st) in Table 1) in which the high-arm side switching element Ssp and the low-arm side switching element Stn are rendered conducting, are repeatedly and switchingly selected. A potential VL1 applied to the DC power supply line L1, and the phase voltages Vr, Vs, Vt, will be described in detail later.

TABLE 1

|  | Srp | Ssp | Stp | Srn | Ssn | Stn | Vdc |
|---|---|---|---|---|---|---|---|
| I(rs) | 1 | 0 | 0 | 0 | 1 | 0 | Vrs |
| I(rt) | 1 | 0 | 0 | 0 | 0 | 1 | Vrt |
| I(st) | 0 | 1 | 0 | 0 | 0 | 1 | Vst |
| I(sr) | 0 | 1 | 0 | 1 | 0 | 0 | Vsr |
| I(tr) | 0 | 0 | 1 | 1 | 0 | 0 | Vtr |
| I(ts) | 0 | 0 | 1 | 0 | 1 | 0 | Vts |

Figure 4:
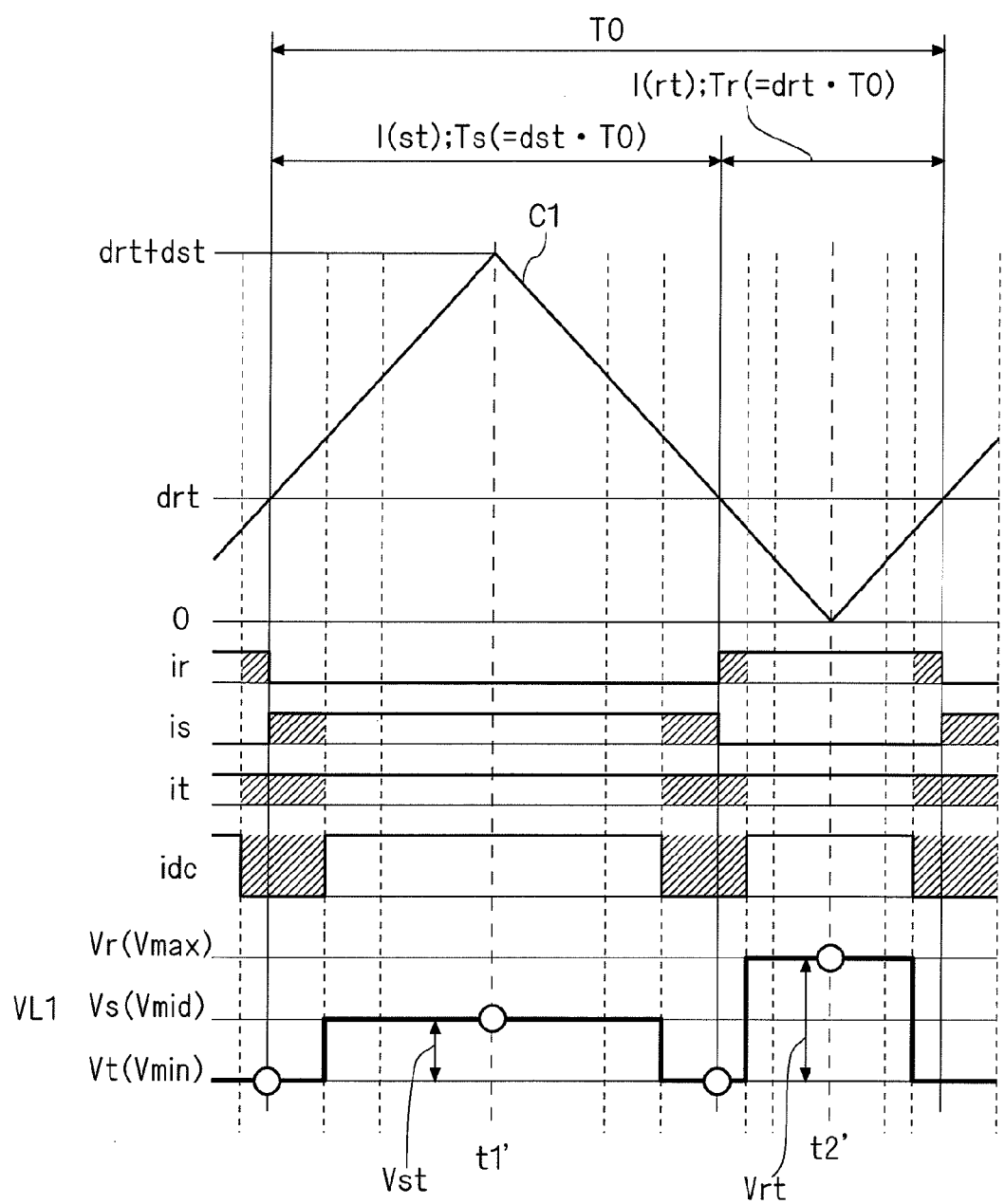
FIG. 4 is a timing chart showing a switching operation of a current-source converter.

FIG. 4 is a timing chart showing a switching operation in the current-source converter 10. FIG. 4 shows a switching operation at a time when the phase voltage Vr exhibits a maximum phase (a phase angle of 30 degrees to 60 degrees) in the current mode 2 (the region corresponding to a phase angle of 30 degrees to 90 degrees). A triangular wave whose inclination has a constant absolute value, for example, a single triangular wave in the shape of an isosceles triangle, is employed as a carrier C1. Then, by comparing the carrier C1 with a command value, the switching in the current-source converter 10 is performed. In the following, it is considered that the command value is approximately constant within a shown range. Actually, the command value is updated in each time period of the carrier cycle, for example.

Here, the exclusive conduction of the switching elements Srp, Ssp in a state where the switching element Stn is conducting is considered. Therefore, the command value is determined based on a duty of conduction of the switching elements Srp, Ssp. In FIG. 4, for simplification, a peak-to-peak amplitude of the carrier C1 whose inclination has the constant absolute value is defined as 1. For the sake of simplicity of description, a minimum value and a maximum value of the carrier C1 are 0 and 1, respectively, if not otherwise specified. Even when the carrier C1 has a different amplitude, the following description applies by considering proportionality, and even when the carrier C1 has a different center value, the following description applies by considering shifting of the carrier C1.

The switching element Stp is not conducting, and its conduction duty can be considered as 0. Therefore, when duties of the switching elements Srp, Ssp are represented by values drt, dst, respectively, the sum of the values drt, dst is 1 in the current mode 2.

As described above, the absolute value of the inclination of the carrier C1 is constant. Therefore, if the switching element Srp is rendered conducting when the carrier C1 has a value from 0 to drt, and the switching element Ssp is rendered conducting when the carrier C1 has a value from drt to 1, a time period of the conduction corresponds to the duty mentioned above.

Accordingly, a control is made so as to render the switching element Srp conducting when the carrier C1 has a value equal to or less than drt, and render the switching element Ssp conducting when the carrier C1 has a value equal to or more than drt. By employing this switching, one cycle T0 of the carrier C1 is divided into a time period Ts in which the carrier C1 has a value equal to or more than the command value and a time period Tr in which the carrier C1 has a value equal to or less than the command value. The time periods Ts, Tr are calculated as dst·T0 and drt·T0, respectively.

In the time period Ts, the switching elements Ssp, Stn are conducting, and therefore line currents is, it flow, so that the DC current idc flows in the DC power supply lines L1, L2. In the time period Tr, the switching elements Srp, Stn are conducting, and therefore line currents ir, it flow, so that the DC current idc flows in the DC power supply lines L1, L2. This can be also recognized as the current-source converter 10 being commutated at a timing when the carrier C1 employs the reference value drt. In a time period in which the voltage-source inverter 20 which will be described later outputs a zero voltage vector, the DC current idc does not flow. In FIG. 4, this time period is illustrated with oblique lines. To improve a waveform of an input current, it is desirable that the time period of the zero voltage vector is distributed between the time periods Ts, Tr at a ratio between the time periods Ts, Tr. The potential VL1 of the DC power supply line L1 shown in FIG. 4 will be described later.

Next, a switching operation of the switching elements Syp, Syn included in the voltage-source inverter 20 will be described. FIG. 5 shows a voltage vector. The voltage-source inverter 20 selects, in a switching manner, a conduction pattern for outputting any of voltage vectors V0 to V7 such that a combined voltage vector moves in a circle around the origin. Table 2 shows conduction patterns of the voltage-source inverter 20 in the respective voltage vectors V0 to V7.

TABLE 2

|  | Sup | Svp | Swp | Sun | Svn | Swn | idc |
|---|---|---|---|---|---|---|---|
| V4 | 1 | 0 | 0 | 0 | 1 | 1 | iu |
| V6 | 1 | 1 | 0 | 0 | 0 | 1 | −iw |
| V2 | 0 | 1 | 0 | 1 | 0 | 1 | iv |
| V3 | 0 | 1 | 1 | 1 | 0 | 0 | −iu |
| V1 | 0 | 0 | 1 | 1 | 1 | 0 | iw |
| V5 | 1 | 0 | 1 | 0 | 1 | 0 | −iv |
| V0 | 0 | 0 | 0 | 1 | 1 | 1 | — |
| V7 | 1 | 1 | 1 | 0 | 0 | 0 | — |

FIG. 6 is a timing chart showing a switching operation in the voltage-source inverter 20. In order that the time period of the zero voltage vector is distributed between the time periods Ts, Tr at the ratio between the time periods Ts, Tr, the same carrier as the carrier C1 of the current-source converter 10 is employed as a carrier C2 of the voltage-source inverter 20, and a command value of the voltage-source inverter 20 is set at each of the sides larger and smaller than the value drt serving as the reference value. The current-source converter 10 and the voltage-source inverter 20 are controlled in synchronization with each other based on the same carrier.

As a specific example, a description will be given of a case where the voltage-source inverter 20 performs switching with repeatedly employing voltage vectors V0(000), V4(100), V6(110), V4(100), and V0(000) in the mentioned order (in a case of a voltage mode 1). In other words, a case is taken as an example where the switching elements Sup, Sun, Svp, Svn are switched while the switching elements Swp, Swn are non-conducting and conducting, respectively (while the output line ACLw is connected to the DC power supply line L2 and the phase voltage Vw exhibits a low potential) (see also Table 2).

When a duty in which the voltage vector V0 is adopted so that all of the switching elements Sup, Svp, Swp are non-conducting, a duty in which the voltage vector V4 is adopted so that the switching element Sup is conducting and both of the switching elements Svp, Swp are non-conducting, and a duty in which the voltage vector V6 is adopted so that both of the switching elements Sup, Svp are conducting and the switching element Swp is non-conducting, are represented by values d0, d4, and d6, respectively, d0+d4+d6=1 is satisfied in the voltage mode 1.

In the carrier C2, a time period Tr in which a value is equal to or more than the value drt is divided at a ratio among d0, d4, and d6. Also, a time period Ts in which a value is equal to or less than the value drt is divided at a ratio among d0, d4, and d6. The switching element Swp is non-conducting, and a duty of its conduction can be considered as 0. Accordingly, due to the above-described division, a time period in which the voltage vector V0 is adopted can be divided at a ratio between the values dst and drt, without a reduction of the duty of the voltage vector in the voltage-source inverter 20.

To be specific, the switching in the voltage-source inverter 20 is controlled as follows (the switching element Swp and Swn are non-conducting and conducting, respectively).

When the carrier C2 adopts a value from drt(1−d0) to drt+dst·d0: the voltage vector V0 is adopted;

when the carrier C2 adopts a value from drt(1−d0−d4) to drt(1−d0), or a value from drt+dst·d0 to drt+dst(d0+d4): the voltage vector V4 is adopted; and when the carrier C2 adopts a value from 0 to drt(1−d0−d4), or a value from drt+dst(d0+d4) to drt+dst=1: the voltage vector V6 is adopted.

The carrier C2 employs the same waveform as that of the carrier C1, and also employs a triangular wave whose inclination relative to time has a constant absolute value. Therefore, the time period of the voltage vector V0 during the time period Ts adopts the following time period Ts0, at either the positive inclination side or the negative inclination side.

[Math. 1]

$$Ts0=((drt+dst\cdot d0)-drt)\times T0/2=d0\cdot dst\cdot(T0/2) \quad (1)$$

In the same manner, the time period of the voltage vector V0 during the time period Tr adopts the following time period Tr0, at either the positive inclination side or the negative inclination side.

[Math. 2]

$$Tr0=(drt-drt(1-d0))\times T0/2=d0\cdot dst\cdot(T0/2) \quad (2)$$

Thus, in the time periods Tr and Ts, the time period of the zero voltage vector is drt·d0·T and dst·d0·T, respectively, and division thereof at the ratio between the values drt and dst is realized. Therefore, in principle, a distortion of an input current which is caused by the zero voltage vector time period can be removed.

Additionally, the time period of the voltage vector V4 per one cycle T0 of the carrier C2 is expressed as follows.

[Math. 3]

$$((drt+dst(d0+d4))-(drt+dst\cdot d0)+drt(1-d0)-drt(1-d0-d4))\times T0/2\times 2=d4(dst+drt)\cdot T0 \quad (3)$$

The time period of the voltage vector V6 per one cycle T0 of the carrier C2 is expressed as follows.

[Math. 4]

$$((drt+dst)-(drt+dst(d0+d4))+drt(1-d0-d4))\times T0/2\times 2=T0\cdot(dst+drt)(1-d0-d4)=d6(dst+drt)\cdot T0 \quad (4)$$

The time period of the voltage vector V0 per one cycle T0 of the carrier C2 is expressed as follows.

[Math. 5]

$$drt\cdot d0\cdot T0+dst\cdot d0\cdot T0=d0(drt+dst)\cdot T0 \quad (5)$$

Thus, the time periods of the voltage vectors V0, V4, and V6 per one cycle T0 of the carrier C2 are realized as the ratio among the values d0, d4, and d6.

Then, in the switching operation in the current-source converter 10, for example, while a voltage-source converter controls a phase voltage and detects a line current as typically described in Japanese Patent Application Laid-Open No. 3-230767 (1991), the current-source converter 10 controls a phase current and detects a line voltage when considering duality. In the following, a method for detecting line voltages between ones of the input lines ACLr, ACLs, ACLt in the current-source converter 10 will be described.

Referring to FIGS. 1 and 4 for example, when the switching elements Ssp, Stn are conducting, that is, when the current-source converter 10 adopts the conduction pattern for outputting the current vector I(rs) (see also Table 1), the DC power supply line L1 and the input line ACLs are short-circuited with each other, and the DC power supply line L2 and the input line ACLt are short-circuited with each other. When a neutral point of the multi-phase power source E1 is defined as a reference of a potential, a potential VL1 applied to the DC power supply line L1 is equal to the phase voltage Vr, and a potential VL2 applied to the DC power supply line L2 is equal to the phase voltage Vt. FIG. 4 shows the potential VL1. In one cycle T0 of the carrier C1 shown in FIG. 4, the switching element Stn is conducting, and therefore the potential VL2 is equal to the phase voltage Vt.

Accordingly, the DC voltage Vdc between the DC power supply lines L1, L2 coincides with the line voltage Vst between the input lines ACLs, ACLt. Thus, at this time, the DC voltage Vdc is detected as the line voltage Vst. However, since the DC voltage Vdc is zero in the time period in which the voltage-source inverter 20 outputs the zero voltage vector, the detection is performed with avoiding this time period.

When the switching elements Srp, Stn are conducting, that is, when the current-source converter 10 adopts the conduction pattern for outputting the current vector I(rt), the same consideration is applied, and the DC voltage Vdc coincides with the line voltage Vrt between the input lines ACLr, ACLt. Thus, at this time, the DC voltage Vdc is detected as the line voltage Vrt. Similarly to the above, the detection is performed with avoiding the time period in which the voltage-source inverter 20 outputs the zero voltage vector.

In a timing chart shown in FIG. 4, a case where the phase voltage Vr has the maximum phase, the phase voltage Vs has the intermediate phase, and the phase voltage Vt has the minimum phase, is illustrated, and the line voltage Vrt is higher than the line voltage Vst. The line voltage Vrs between the input lines ACLr, ACLs can be expressed as a difference between the line voltage Vrt and the line voltage Vst (Vrs=Vrt−Vst). Accordingly, by using the two detected line voltages Vrt, Vst, the other line voltage Vrs can be calculated. Thus, all of the three line voltages Vrt, Vst, Vrs in one cycle T0 of the carrier C1 can be detected.

Table 1 also shows a line voltage coincident with the DC voltage Vdc in each of the conduction patterns for outputting the respective current vectors I(rs), I(rt), I(st), I(sr), I(tr), I(ts). For example, each of the line voltages Vrs, Vsr indicates the line voltage between the input lines ACLr, ACLs. However, the line voltage Vrs indicates that a potential at the input line ACLr side is higher, and the line voltage Vsr indicates that a potential at the input line ACLs side is higher. The same applies to the line voltages Vst, Vsr, Vtr, Vts. As shown in Table 1, based on a relationship between the conduction pattern and the line voltage, the DC voltage Vdc is detected as the line voltage of the input line.

As described above, in order to detect the line voltage, it suffices that the DC voltage Vdc between the DC power supply lines L1, L2 is detected. Therefore, as compared with the method of obtaining amplitude information by detecting a voltage between both ends of the smoothing capacitor to thereby detect a DC voltage as disclosed in Japanese Patent Application Laid-Open No. 5-056682 (1993), the amplitude information can be obtained with a high accuracy, and an instantaneous waveform of the input voltage can be obtained. Additionally, it is apparent that the line voltage can be detected with a simple configuration as compared with when at least two line voltages are directly detected in each of the input lines ACLr, ACLs, ACLt.

Since the DC voltage Vdc is detected, monitoring of an instantaneous stop of the multi-phase power source E1 and a drop of an output voltage (phase voltages Vr, Vs, Vt) of the multi-phase power source E1 are allowed without adding anything in the configuration.

Next, a method for detecting line currents iu, iv, iw flowing in the output lines ACLu, ACLv, ACLw in the voltage-source inverter 20 will be described. The positive direction of the line current iu, iv, iw is a direction flowing from the voltage-source inverter 20 to the motor M1.

For example, referring to FIGS. 1 and 6, when the voltage-source inverter 20 adopts the conduction pattern for outputting the voltage vector V4, only the high-arm side switching element Sup is connected to the DC power supply line L1, and therefore the DC current idc flowing in the DC power supply lines L1, L2 coincides with the line current iu. Accordingly, at this time, the DC current idc is detected as the line current iu.

When the voltage-source inverter 20 adopts the conduction pattern for outputting the voltage vector V6, only the low-arm side switching element Swn is connected to the DC power supply line L2, and therefore the DC current idc coincides with the line current iw except for the polarity. A line current having the different polarity is denoted with addition of minus. Therefore, at this time, the DC current idc is detected as the line current −iw.

Since the sum of the line currents iu, iv, iw is 0, the line current iv is expressed as a difference between the line current iw and the line current iu (iv=iw−iu). Accordingly, by using the two detected line currents iw, iu, the other line current iv can be calculated. Thus, all of the three line currents iu, iv, iw in one cycle T0 of the carrier C2 can be detected.

Table 2 also shows a line current coincident with the DC current idc in each of the conduction patterns for outputting the respective voltage vectors V1 to V6. As shown in Table 2, based on a relationship between the conduction pattern and the line current, the DC current idc is detected as the line current of the output line.

The carrier C1 is adopted the carrier C2, and the current-source converter 10 and the voltage-source inverter 20 operate in synchronization with each other. Therefore, at a time t1' for example, the line voltage and the line current can be detected at the same timing.

As shown in FIG. 6, in the voltage-source inverter 20, in the time period Ts in which the carrier C2 has a value equal to or more than drt and in the time period Tr in which the carrier C2 has a value equal to or less than drt, the voltage vector is outputted with the same duty. The value drt is a duty of the switching element Srp, and adopts a value from 0 to 1. For example, when the value drt is close to 0, the time period Tr is quite short. A time period of each of the voltage vectors V0, V4, V6 which are outputted within the time period Tr is still shorter. If a time period (dead time period) in which a pair of the high-arm side switching element and the low-arm side switching element connected to one input line are both rendered non-conducting is provided, a time period of each of the outputted voltage vectors V0, V4, V6 is still further shorter. In such a case, a time period of outputting a voltage vector may not satisfy a time period enough to detect the DC current idc. Therefore, it is desirable that when detecting the DC current idc, the DC current idc is detected in the longer one of the time periods Tr, Ts. This can reduce the possibility that one of the time periods becomes short to disable the detection due to a dead time for example.

Second Embodiment

In this embodiment, a description will be given of an exemplary configuration for realizing the control of the power converting apparatus and the state quantity detection method which have been described in the first embodiment.

FIG. 7 shows an exemplary conceptual configuration of a control section which controls the power converting apparatus shown in FIG. 1. The control section 100 has a trapezoidal voltage command section 11, space vector computation sections 12, 22, comparators 13, 23, 24, a current-source logic conversion section 14, a two-phase modulation voltage command section 21, a logical add section 25, sample hold circuits 31, 41, comparison sections 32, 42, a voltage computation section 33, a current computation section 43, an applied carrier selection section 44, and a carrier generation section 51.

Firstly, a method for generating a switch signal to be applied to the current-source converter 10, and its configuration will be described. In general outline, a switch signal for a virtually considered voltage-source converter (hereinafter referred to as a "virtual voltage-source converter") is generated, and the switch signal is logically converted into a switch signal for a current-source converter and outputted to the current-source converter 10. As described in the first embodiment, a trajectory of a current vector of a current outputted from the current-source converter 10 has a hexagonal shape (FIG. 3) whose vertexes are represented by the current vectors I(rs), I(rt), I(st), I(sr), I(tr), I(ts). When considered based on the virtual voltage-source converter, this corresponds to a trajectory having a hexagonal shape (FIG. 5) whose vertexes are represented by the voltage vectors V1 to V6. Therefore, in order to output a voltage vector describing a trajectory of a hexagonal shape whose vertexes are represented by the voltage vectors V1 to V6, a switch signal to be used for the virtual voltage-source converter is converted into a switch signal to be used for the current-source converter 10 to output a current vector, and outputted to the current-source converter 10.

In the virtual voltage-source converter, the voltage vectors V1 to V6 are adopted. That is, the high-arm side switching element is conducting for one phase, the low-arm side switching element is conducting for another phase, and the high-arm side switching element and the low-arm side switching element are alternately conducting for the other one phase (except in the dead time).

Accordingly, in a waveform of the voltage command in the virtual voltage-source converter, the voltage command for any one phase always adopts a maximum value of a carrier, and the voltage command for another phase adopts a minimum value of a carrier. The voltage command for the other one phase adopts a value between the minimum value and the maximum value of the carrier, and can be recognized as an intermediate phase between the other two phases.

Figure 8:
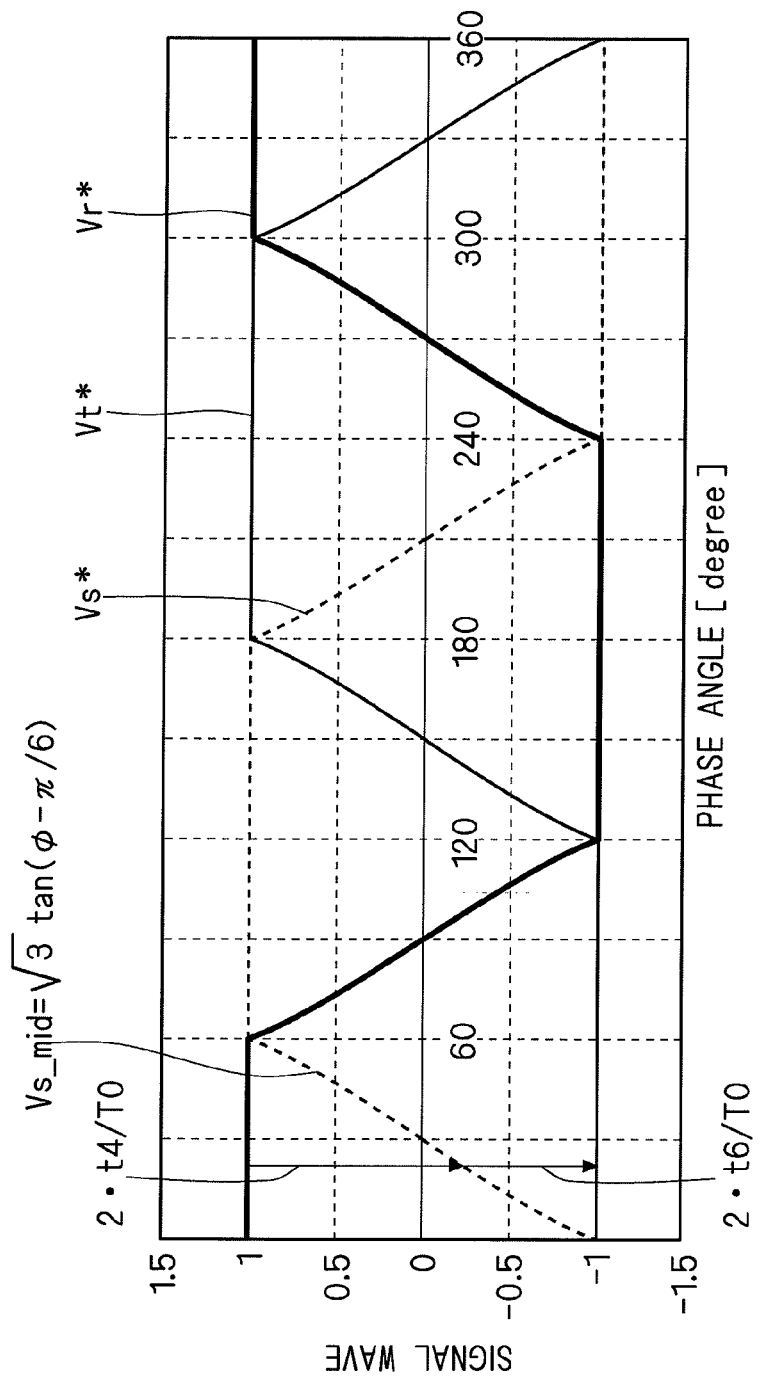
FIG. 8 is a diagram showing trapezoidal voltage commands.
Figure 9:
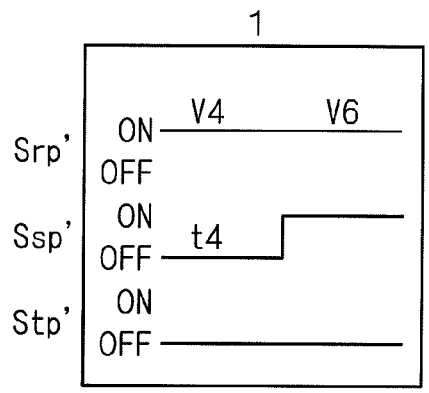
FIG. 9 is a diagram showing a time period of a voltage vector of a voltage outputted in a voltage mode 1, and a conduction pattern thereof.
Figure 10:
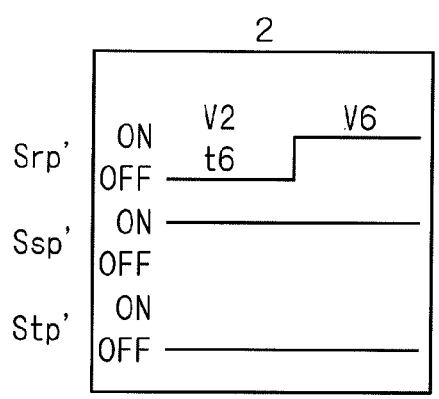
FIG. 10 is a diagram showing a time period of a voltage vector of a voltage outputted in a voltage mode 2, and a conduction pattern thereof.
Figure 11:
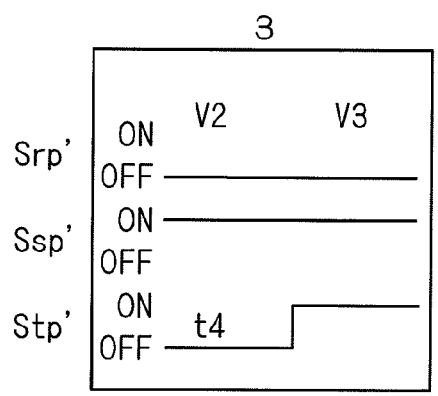
FIG. 11 is a diagram showing a time period of a voltage vector of a voltage outputted in a voltage mode 3, and a conduction pattern thereof.
Figure 12:
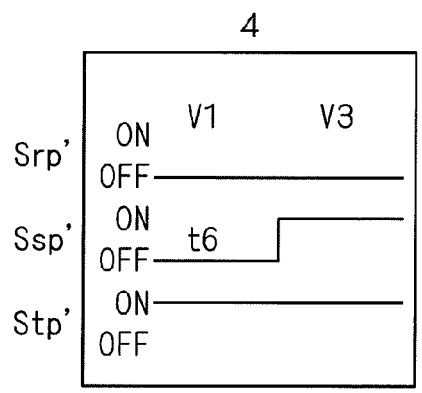
FIG. 12 is a diagram showing a time period of a voltage vector of a voltage outputted in a voltage mode 4, and a conduction pattern thereof.
Figure 13:
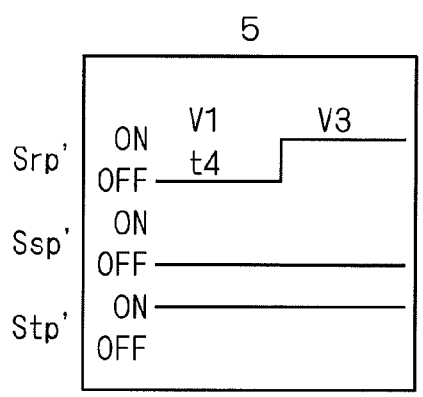
FIG. 13 is a diagram showing a time period of a voltage vector of a voltage outputted in a voltage mode 5, and a conduction pattern thereof.
Figure 14:
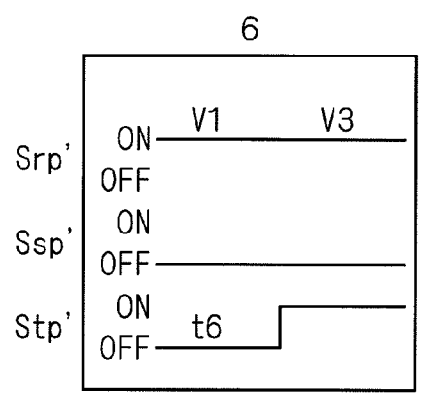
FIG. 14 is a diagram showing a time period of a voltage vector of a voltage outputted in a voltage mode 6, and a conduction pattern thereof.

The trapezoidal voltage command section 11 generates a voltage command for such a virtual voltage-source converter. FIG. 8 is a graph illustrating such voltage commands Vr*, Vs*, Vt*. Each of the voltage commands Vr*, Vs*, Vt* has a 360-degrees cycle, and the voltage commands Vr*, Vs*, Vt* are shifted from one another by 120 degrees. Each of the voltage commands Vr*, Vs*, Vt* exhibits a trapezoidal wave having a pair of flat zones each continuing for 120 degrees and a pair of inclined regions each inclined at 60 degrees and each connecting the pair of flat zones. Here, a case where the values −1 and 1 are adopted as the minimum value and the maximum value of the voltage commands Vr*, Vs*, Vt*, respectively, is illustrated. Since there is a phase difference of 30 degrees between the current vector and the voltage vector (see also FIGS. 3 and 5), a value obtained by a parallel shift of the voltage command shown in FIG. 8 toward a larger phase angle by 30 degrees is actually outputted. In the following description, a phase angle between the voltage source and the current source is not considered. A technique described below utilizes the techniques disclosed in Japanese Patent Application Laid-Open No. 2007-312589 and Japanese Patent Application Laid-Open No. 2007-312598.

In the carrier C1, the values 0 and 1 are adopted as the minimum value and the maximum value, respectively. Therefore, considering that the maximum value and the minimum value of the voltage commands Vr*, Vs*, Vt* are 0 and 1, respectively, the basic formula of a space vector modulation in a region where the phase angle is 0 degree to 60 degrees is expressed as the following formula.

[Math. 6]

$$t4/T0 = (1 - Vs\_mid^*)/2 = (1 - \sqrt{3}\tan(\phi - \pi/6))/2 \quad (6)$$

[Math. 7]

$$t6/T0 = 1 - t4/T0 = (1 + \sqrt{3}\tan(\phi - \pi/6))/2 \quad (7)$$

Here, t4 and t6 represent the time periods for outputting the voltage vectors V4 and V6 in the one cycle T0 of the carrier C1, and Vs_mid* represents the voltage command Vs* which is the intermediate phase. Since the time period t4 for outputting the voltage vector V4 corresponds to the time period for outputting the current vector I(rt), the value t4/T0 corresponds to the value drt. Similarly, since the time period for outputting the voltage vector V6 corresponds to the time period for outputting the current vector I(st), the value t6/T0 corresponds to the value dst. Such a computation process is performed in the space vector computation section 12, and the values drt, dst are outputted.

The comparator 13 compares the value drt obtained from the space vector computation section 12 with the carrier C1 obtained from the carrier generation section 51. The comparator 13 thus outputs a voltage-source switch signal for outputting the voltage vector V4 in the time period in which the carrier C1 has a value equal to or more than drt, and outputs a voltage-source switch signal for outputting the voltage vector V6 in the time period in which the carrier C2 has a value equal to or less than drt.

The basic formula of a space vector modulation in each voltage mode can be considered as follows. For example, in the voltage mode 2 (the phase angle is 60 degrees to 120 degrees), the time period t6/T0 for outputting the voltage vector V6 per one cycle of the carrier C1 can be calculated by replacing t4 with t6, and Vs_mid* with Vr_mid* (the voltage command Vr* which is the intermediate phase) in the formula (6), respectively. In the voltage mode 2, the time period for outputting the voltage vector V2 per one cycle of the carrier C1 can be calculated by replacing t6 with t2 in the formula (7). Table 3 associates a time period of a voltage vector of a voltage outputted in each voltage mode, with the time periods t4, t6 of the voltage vectors V4, V6 outputted in the voltage mode 1. By replacing the time period in the formulas (6) and (7) and replacing the voltage command of the intermediate phase in the formula (6) in accordance with this correspondence table, the basic formula of a space vector modulation in each voltage mode can be recognized.

Table 3 shows a correspondence relation between a time period of a voltage vector in each of the voltage modes 1 to 6 and the time periods t4, t6, t0 of the voltage vectors V0, V4, V6 in the voltage mode 1 in the formulas (6) and (7). However, as described above, the voltage vector V0 is not used in the current-source converter 10.

TABLE 3

|  | 1 | 2 | 3 | 4 | 5 | 6 |
| --- | --- | --- | --- | --- | --- | --- |
| t4 | t4 | t6 | t2 | t3 | t1 | t5 |
| t6 | t6 | t2 | t3 | t1 | t5 | t4 |
| t0 | t0, t7 | t0, t7 | t0, t7 | t0, t7 | t0, t7 | t0, t7 |

For reference, FIGS. 9 to 14 show time periods corresponding to the respective voltage vectors in which switch signals Srp', Ssp', Stp' are conducting in the voltage modes 1 to 6, respectively. In FIGS. 9 to 14, the time periods t4, t6 of the voltage vectors V4, V6 in the voltage mode 1 are used. The switch signals Srp', Ssp', Stp' referred to herein are not the switch signals given to the switching elements Srp, Ssp, Stp, but switch signals given to the high-arm side switching elements of the r-phase, s-phase, and t-phase, which are included in the virtual voltage-source converter. The switch signal given to the current-source converter 10 is obtained by performing logic conversion using the voltage-source switch signal Srp', Ssp', Stp' and switch signals Sm', Ssn', Stn' which are complementary (logically inverted) with the voltage-source switch signal Srp', Ssp', Stp'.

The current-source logic conversion section 14 logically converts a switch signal for a virtual voltage-source converter which is obtained from the comparator 13, into a switch signal for a current-source converter. This logical conversion is performed by using the technique disclosed in Koji Kato, Jun-ichi Itoh, "Improvement of Waveform for Step-up AC/DC/AC Direct Power Converter". Hereinafter, a specific description will be given.

FIG. 15 is a circuit diagram showing a configuration of an inverter discussed here. This inverter is an inverter virtually considered for the purpose of the discussion of the switching in the current-source converter 10. Since this inverter is not directly related to the voltage-source inverter 20, naming of an a-phase, a b-phase, and a c-phase is adopted for a three-phase AC. This virtually considered inverter (hereinafter referred to as an "virtual inverter") has a switching element Sap at the high-arm side of the a-phase, and the switching element San at the low-arm side thereof. Similarly, switching elements Sbp, Sbn are provided in the b-phase, and switching elements Scp, Scn are provided in the c-phase.

A line current ia of the a-phase is obtained as a difference between a phase current ica between the a-phase and the c-phase, and a phase current iba between the b-phase and the a-phase. Therefore, only when switching for making a pair of these phase currents flow is performed, the line cuurent ia of the a-phase flows. The same applies to line currents of the other phases. Whether a phase current ijk flows in the high-arm side switching element or not is indicated by the code Sjk, and whether a phase current ijk flows in the low-arm side switching element or not is indicated by the code SjkB. Here, the codes i, j, k which are different from one another represent the codes a, b, c. The codes Sjk, SjkB adopt the binary logic of "1"/"0", thereby indicating that the phase current ijk "flows"/"does not flow".

If, when the virtual inverter makes a line current flow based on comparison between the phase voltage command and the carrier, switch commands for controlling conduction/non-conduction of the high-aim side switching element Sjp and the low-arm side switching element Sjn are represented by the codes Sj$^+$ and Sj$^-$, respectively, the contents disclosed in Takaharu Takeshita, Koji Toyama, Nobuyuki Matsui, "PWM Scheme for Current Source Three-Phase Inverters and Converters" are as follows.

[Math. 8]

$$Sa^+=Sac\cdot SbaB, Sb^+=Sba\cdot ScbB, Sc^+=Scb\cdot SacB$$

$$Sa^-=Sba\cdot SacB, Sb^-=Scb\cdot SbaB, Sc^-=Sac\cdot ScbB \tag{8}$$

Here, furthermore, in view of duality of a phase voltage of a voltage-source inverter and a phase current of a current-source inverter, it is understood that a right-hand logical value in each of the above formulas is obtained as a result of comparison between the phase voltage and the carrier in the voltage-source inverter. According to Takaharu Takeshita, Koji Toyama, Nobuyuki Matsui, "PWM Scheme for Current Source Three-Phase Inverters and Converters", a command value of the phase current ijk corresponds to a command value of the phase voltage Vj. Accordingly, the code Sjk coincides with a logic for rendering the switching element Sjp conducting based on comparison between the phase voltage command Vj* and the carrier. The code SjkB coincides with a logic for rendering the switching element Sjn conducting based on comparison between the phase voltage command Vj* and the carrier.

The voltage commands Vr*, Vs*, Vt* shown in FIG. 8 are adopted as voltage commands Va*, Vb*, Vc* in the above-described virtual inverter. Hereinafter, a case where the phase angle is 0 to 60 degrees will be described. Since the voltage commands Va* and Vc* adopt the values 1 and −1, respectively, Sac=1, SacB=0, Scb=0, and ScbB=1 are satisfied. Thus, Sa$^+$=SbaB, Sb$^+$=Sba, and Sc$^+$=Sa$^-$=Sb$^-$=0 are satisfied.

The code SbaB coincides with a logic for rendering the switching elements Sap, Sbp conducting/non-conducting based on comparison between the phase voltage command Vb and the carrier, respectively. The code Sba coincides with a logic for rendering the switching elements Sbp, Sap conducting/non-conducting based on comparison between the phase voltage command Vb and the carrier, respectively. To be more specific, when the phase voltage command Vb is equal to or less than the carrier, the switching element Sap is rendered conducting, and when the phase voltage command Vb is equal to or more than the carrier, the switching element Sbp is rendered conducting. The codes Sa$^+$ and Sb$^+$ represent time periods in which the switching elements Sap, Sbp are rendered conducting, when a line current is made flow.

When this is applied to the present application, the a-phase, b-phase, and c-phase may be replaced with the r-phase, s-phase, and t-phase, respectively. Considering that the comparison is performed while aligning the maximum value and the minimum value of the voltage command and the maximum value and the minimum value of the carrier C1, when the value of carrier C1 is equal to or less than the value t4/T0 calculated by using the voltage command Vs*, the switching element Srp is rendered conducting, and when the value of carrier C1 is equal to or more than the value t4/T0, the switching element Ssp is rendered conducting.

From the above, the value of the voltage command Vs* serves as a reference value drt used in obtaining the command value of the carrier C1. Moreover, a timing of commutation by which the switching elements Srp, Ssp of the current-source converter 10 are alternately rendered conducting with time periods proportional to the ratio between the values drt and 1−drt, is defined as a value of the carrier C1. In the other phase angles, the above description also applies in terms of the values of the voltage commands Vr* and Vt*.

In the above-described manner, the result obtained by the comparator 13 is given to the current-source logic conversion section 14, and conversion is performed in accordance with the formula (8). From this conversion, switch signals for the switching elements Srp, Srn, Ssp, Ssn, Stp, Stn are obtained.

The trapezoidal voltage command section 11, the space vector computation section 12, the comparator 13, and the current-source logic conversion section 14 can be recognized as a converter gate signal generation section which gives switch signals to the switching elements Srp, Ssp, Stp, Srn, Ssn, Stn.

Next, a configuration for generating a switch signal to be given to the voltage-source inverter 20 will be described.

Figure 16:
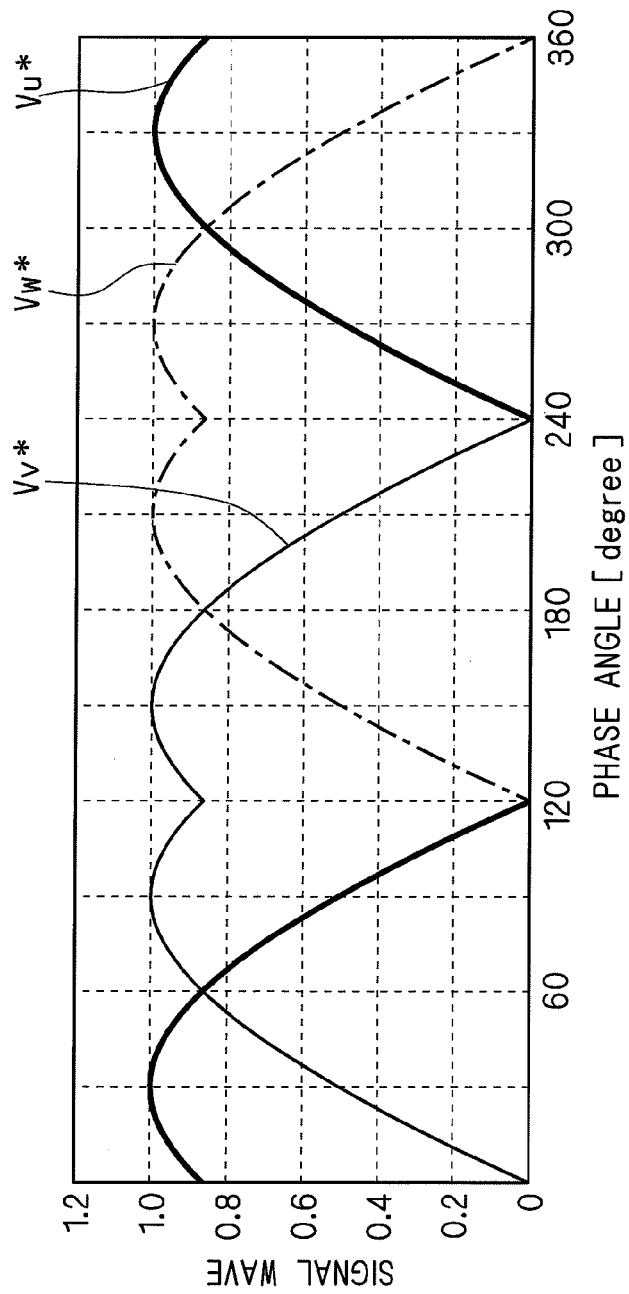
FIG. 16 is a diagram showing two-phase modulation voltage commands.
Figure 17:
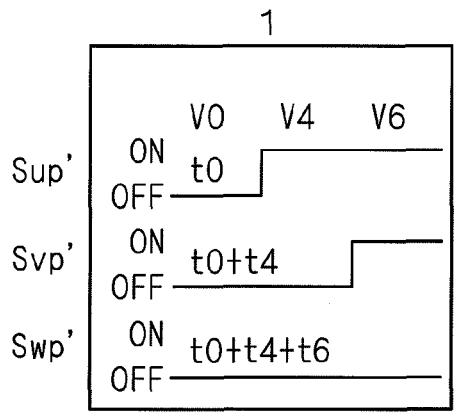
FIG. 17 is a diagram showing a time period of a voltage vector of a voltage outputted in the voltage mode 1, and a conduction pattern thereof.
Figure 18:
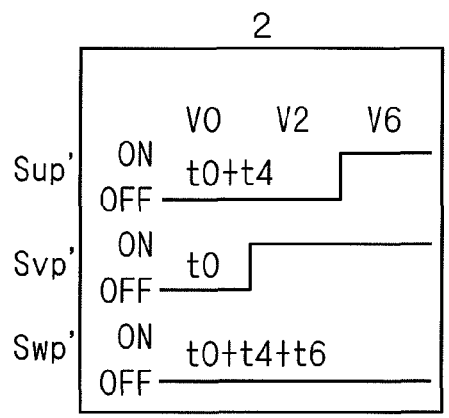
FIG. 18 is a diagram showing a time period of a voltage vector of a voltage outputted in the voltage mode 2, and a conduction pattern thereof.
Figure 19:
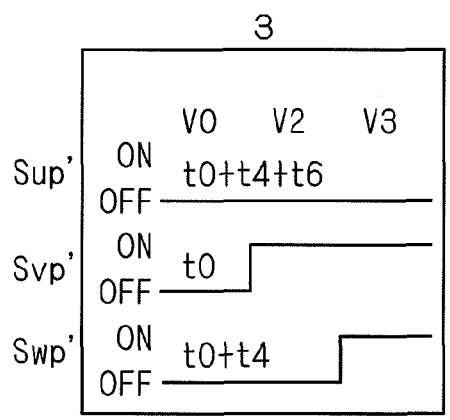
FIG. 19 is a diagram showing a time period of a voltage vector of a voltage outputted in the voltage mode 3, and a conduction pattern thereof.
Figure 20:
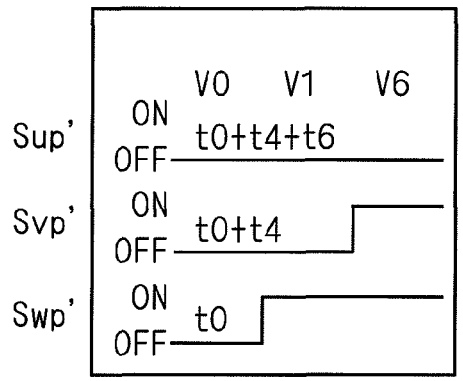
FIG. 20 is a diagram showing a time period of a voltage vector of a voltage outputted in the voltage mode 4, and a conduction pattern thereof.
Figure 21:
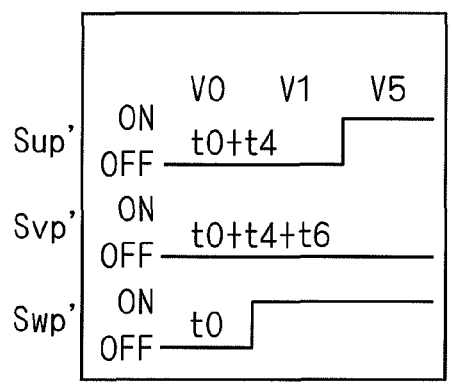
FIG. 21 is a diagram showing a time period of a voltage vector of a voltage outputted in the voltage mode 5, and a conduction pattern thereof.
Figure 22:
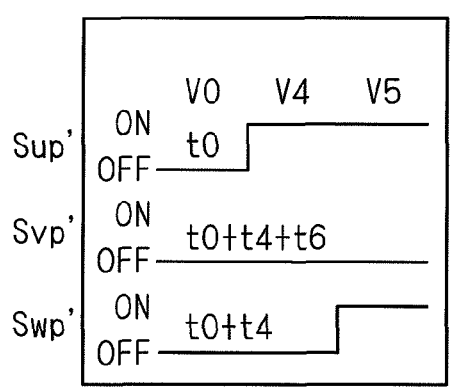
FIG. 22 is a diagram showing a time period of a voltage vector of a voltage outputted in the voltage mode 6, and a conduction pattern thereof.

The two-phase modulation voltage command section 21 generates a voltage command. FIG. 16 is a graph illustrating voltage commands Vu*, Vv*, Vw*. Each of the voltage commands Vu*, Vv*, Vw* has a 360 degrees cycle, and the voltage commands Vu*, Vv*, Vw* are shifted from one another by 120 degrees. Each of the voltage commands Vu*, Vv*, Vw* has a first sinusoidal wave zone starting from a value of 0 and continuing for 120 degrees, a second sinusoidal wave zone continuous with the first sinusoidal wave zone and forming a shape bilaterally symmetrical shape with the first sinusoidal wave, and a flat zone continuous with the second sinusoidal wave zone. Here, a case where the values 0 and 1 are adopted as the minimum value and the maximum value of the voltage commands Vu*, Vv*, Vw*, respectively, is shown as an example.

For example, the basic formula of a space vector modulation in a region where the phase angle is 0 degree to 60 degrees, is expressed as the following formula.

[Math. 9]

$$t0/T0 = 1 - Vu\_\max^* = 1 - ks\cdot\sin(\phi+\pi/3) \tag{9}$$

[Math. 10]

$$t4/T0 = Vu\_\max^* - Vv\_\mathrm{mid}^* = ks\cdot\sin(\pi/3-\phi) \tag{10}$$

[Math. 11]

$$t6/T0 = Vv\_\mathrm{mid}^* = ks\cdot\sin\phi \tag{11}$$

Here, t0 represents a time period of the voltage vector V0 of a voltage outputted in one cycle T0 of the carrier C2. ks represents a modulation factor. Vu_max* represents the phase voltage command Vu* which is the maximum phase. Vv_mid* represents the phase voltage command Vv* which is the intermediate phase.

The value t0/T0 which is a time period in which the voltage vector V0 per one cycle of the carrier C2 is outputted corresponds to the value d0 which is the duty of the voltage vector V0. Similarly, the value t4/T0 corresponds to the value d4, and the value t6/T0 corresponds to the value d6.

Then, by using the values drt, dst outputted from the space vector computation section 12, values drt(1−d0−d4), drt(1−d0), drt+dst·d0, drt+dst(d0+d4), and drt+dst, which are objects of comparison with the carrier C2, are calculated.

The above-described computation process is performed in the space vector computation section 22.

The comparator 23 compares the carrier C2 with each of the values drt(1−d0) and drt(1−d0−d4), and outputs to the logical add section 25 a switch signal for outputting the voltage vector V0, V4, V6, V4, V0 in the time period Tr.

The comparator 24 compares the carrier C2 with each of the values drt+dst·d0 and drt+dst(d0+d4), and outputs to the logical add section 25 a switch signal for outputting the voltage vector V0, V4, V6, V4, V0 in the time period Ts.

The logical add section 25 obtains a logical add of the switch signals obtained from the comparators 23 and 24, and outputs a result of the addition to the voltage-source inverter 20.

The two-phase modulation voltage command section 21, the space vector computation section 22, the comparators 23, 24, and the logical add section 25 can be recognized as the inverter gate signal generation section which gives switch signals to the switching elements Sup, Svp, Swp, Sun, Svn, Swn.

For reference, FIGS. 17 to 22 show time periods for outputting the switch signals Sup', Svp', Swp' which render the switching elements Sup, Svp, Swp conducting in the respective voltage modes. For example, in the voltage mode 2, the time period t0/T0 for outputting the voltage vector V0 per one cycle of the carrier C2 can be calculated by replacing Vu_max* with Vv_max* in the formula (9). The time period t4/T0 for outputting the voltage vector V4 per one cycle of the carrier C1 can be calculated by replacing t6 with t4, Vu_max* with Vv_max*, and Vv_mid* with Vu_mid*, respectively, in the formula (11). The time period t2/T0 for outputting the voltage vector V2 per one cycle of the carrier C1 can be calculated by replacing t4 with t2, and Vv_mid* with Vu_mid*, in the formula (10). Such replacements may be performed with reference to the correspondence of the time periods of the voltage vectors of voltages outputted in the respective voltage modes shown in Table 3, and the maximum phase and the intermediate phase in the voltage command shown in FIG. 16. FIGS. 17 to 22 show time periods in which the switch signals Sup', Svp', Swp' corresponding to the respective voltage vectors are conducting in the voltage modes 1 to 6, respectively. In FIGS. 17 to 22, the time periods t0, t4, t6 of the voltage vectors V0, V4, V6 in the voltage mode 1 are used.

Next, a configuration for detecting a line voltage between ones of the input lines will be described. The comparison section 32 compares the values drt, dst obtained from the space vector computation section 12 with the carrier C1 obtained from the carrier generation section 51, and outputs the conduction pattern and a sampling/holding timing of the current-source converter 10, to the sample hold circuit 31.

Based on the conduction pattern and the sampling/holding timing obtained from the comparison section 32, the sample hold circuit 31 samples/holds the DC voltage Vdc between the DC power supply lines L1, L2, and detects it as a line voltage. The conduction pattern received from the comparation section 32 is the conduction pattern shown in Table 2. When taking correspondence with the conduction patterns shown in Table 1, the conduction patterns for outputting the voltage vectors V4, V6, V2, V3, V1, V5 correspond to the conduction patterns for outputting the current vectors I(rs), I(rt), I(st), I(sr), I(tr), I(ts), respectively. Based on this correspondence, for the conduction pattern received from the comparator 32, a line voltage coincident with the DC voltage Vdc can be recognized, and the sample hold circuit 31 can detect the DC voltage Vdc as the line voltage based on the conduction pattern obtained from the comparator 32.

For the detection of the DC voltage Vdc, for example, a voltage between both ends of the resistor R2 is detected. The resistors R1, R2 divide the voltage between the DC power supply lines L1, L2, based on resistance values of the resistors R1, R2. Accordingly, considering the resistance values of the resistors R1, R2, it can be considered that the sample hold circuit 31 detects the DC voltage Vdc between the DC power supply lines L1, L2.

Although the sample hold circuit 31 obtains the conduction pattern from the comparison section 32, this is not limitative. The sample hold circuit 31 may obtain the conduction pattern from the switch signal outputted by the current-source logic conversion section 14.

As the sampling/holding timing, with reference to FIG. 4 for example, a time point (time t1') at which the carrier C1 has the maximum value and a time point (time t2') at which the carrier C1 has the minimum value may be outputted. Since the carrier C1 has a single triangular waveform, the time point at which the carrier C1 has the maximum value and the minimum value is located at the center of the time period for outputting the current vector (that is, the center of the time period Ts, the center of the time period Tr). Therefore, by performing a sampling at this time point, even when the duty drt is reduced for example, a more stable voltage value can be sampled/held, and detected.

It may also be acceptable that a time point at which the carrier C1 has the value drt is outputted to the sample hold circuit 31, and the DC voltage Vdc at this time point is detected as an offset of the DC voltage Vdc. In other words, it may be inputted as an offset adjustment signal of a signal amplifier (not shown) included in the sample hold circuit 31. Thereby, for example, even if there is a fluctuation in the potential applied to the DC power supply line L2, a line voltage can be detected with an influence of this fluctuation being removed therefrom.

As described in the first embodiment, the voltage computation section 33 uses two line voltages detected in one cycle T0 of the carrier C1 to thereby calculate the other one line voltage. The voltage computation section 33 is not limited thereto, but may convert the detected line voltages into voltage values with respect to mutually orthogonal α-axis and β-axis of a stationary coordinate system. By additionally using a power source phase (for example, the phase of the phase voltage Vr), the detected line voltage can be converted into voltage values with respect to mutually orthogonal d-axis and q-axis in a rotating coordinate system which rotates in synchronization with the three-phase AC voltage (for example, the phase voltage Vr). These can be used as instantaneous voltage information used for controlling the direct power converting apparatus.

Next, a configuration for detecting a line current will be described.

The applied carrier selection section 44 receives the values drt, dst from the space vector computation section 12, and outputs to the comparison section 42 a value serving as an object of comparison with the carrier C2 in the longer one of the time periods Tr, Ts. Specifically, when the value drt is greater than the value dst, the value drt+dst·d0 and the value drt+dst(d0+d4) are outputted. When the value dst is greater than the value drt, the value drt(1−d0) and the value drt(1−d0−d4) are outputted.

The comparison section 42 compares the value obtained from the applied carrier selection section 44 with the carrier C2 (the same as the carrier C1) obtained from the carrier generation section 51, and outputs the conduction pattern and the sampling timing of the voltage-source inverter 20 in the time period Tr or the time period Ts, to the sample hold circuit 41.

The sample hold circuit 41 samples/holds a current value of a current flowing in the shunt resistor R3 based on the conduction pattern and the sample hold timing obtained from the applied carrier selection section 44, and detects it as a line current. The detection of the line current based on the conduction pattern is as described in the first embodiment.

As the sample/hold timing, the following two timings are outputted for example. With reference to FIG. 23, when the conduction pattern in the time period Ts is outputted, the time point (time t1') at which the carrier C2 has the maximum value and the time point (time t3') at which the carrier C2 has the value drt+dst(d0+d4/2) are outputted as the sampling timing. The time point at which the carrier C2 has the maximum value is located at the center of the time period for outputting the voltage vector V6. Since the value dt+dst (d0+d4/2) is a central value in a range between the value drt+dst·d0 and the value drt+dst(d0+d4), the time point at which the carrier C2 has the value drt+dst(d0+d4/2) is located at the center of the time period for outputting the voltage vector V4. Therefore, a more stable current value can be sampled/held, and detected.

On the other hand, when the conduction pattern in the time period Tr is outputted, the time point at which the carrier C2 has the minimum value and the time point at which the carrier C2 has the value drt(1−d0−d4/2) are outputted as the sampling timing. The value drt(1−d0−d4/2) is a central value in a range between the value drt(1−d0) and the value drt(1−d0−d4).

It may be acceptable that the time point at which the carrier C2 has the value drt is outputted to the sample hold circuit 41 and the DC current idc at this time point is detected as an offset of the DC current idc. In other words, it may be inputted as an offset adjustment signal of the signal amplifier (not shown) included in the sample hold circuit 41. Thereby, even if there is a fluctuation in the offset of the DC current ide, a line current can be detected with an influence of this fluctuation being removed therefrom.

The current computation section 43 uses two line currents detected in one cycle T0 of the carrier C2 to thereby detect the other one line current. The current computation section 43 is not limited thereto, but may convert the line currents into current values with respect to mutually orthogonal α-axis and β-axis of a stationary coordinate system fixed to a stator of the motor M1, may further convert them into current values with respect to mutually orthogonal d-axis and q-axis of a rotating coordinate system fixed to a rotor of the motor M1 using phase information. The phase information can be obtained by detecting rotation of the motor M1, for example. These can be used as instantaneous current information used for controlling the direct power converting apparatus.

Third Embodiment

In this embodiment, a description will be given of another exemplary configuration for realizing the control of the power converting apparatus and the state quantity detection method which have been described in the first embodiment.

FIG. 24 shows an exemplary conceptual configuration of a control section which controls the power converting apparatus shown in FIG. 1. As compared with the second embodiment, an applied signal selection section 45 is provided instead of the applied carrier selection section 44, and the comparison section 42 serves to perform the function of the comparison section 32.

The comparison section 42 outputs a sampling timing to the sample hold circuits 31, 41, based on comparison between a value obtained from the space vector computation section 22 and a carrier obtained from the carrier generation section 51. For example, with reference to FIG. 23, the comparison section 42 outputs the time points (the times t2', t4', t3', and t1') at which the carrier C2 has the values 0, drt(1−d0−d4/2), drt+dst(d0+d4/2), and drt+dst(=1), respectively, as the sampling timings.

Based on the received sampling timings, the sample hold circuit 31 samples/holds and detects the DC voltage Vdc between the DC power supply lines L1, L2, and outputs the detected DC voltage Vdc to the applied signal selection section 45. Specifically, the DC voltages Vdc are detected at the times t1', t3' as the line voltages Vst, and these are outputted to the applied signal selection section 45. The DC voltages are detected at the times t2', t4' as the line voltages Vrt, and these are outputted to the applied signal selection section 45.

Based on the received sampling timings, the sample hold circuit 41 detects the DC current idc flowing in the DC power supply lines L1, L2, and outputs the detected DC current idc to the applied signal selection section 45. Specifically, the DC currents idc at the times t1', t2' are outputted as the line current −iw, to the applied signal selection section 45. The DC currents idc at the times t3', t4' are outputted as the line current iu, to the applied signal selection section 45.

The applied signal selection section 45 selects, from the line voltages received from the sample hold circuit 31, the line voltage Vst at the time t1' and the line voltage Vrt at the time t2', and outputs the selected line voltages to the voltage computation section 33. The applied signal selection section 45 also selects, from the line currents received from the sample hold circuit 41, the line currents −iw, iu in the longer one of the time periods Tr, Ts, and outputs the selected line currents to the current computation section 43.

As described above, while the comparison section 42 serves to perform the function of the comparison section 32, the line voltages between ones of the input lines and the line currents of the output lines can be detected. Therefore, the line voltage detection and the line current detection can be realized with a simpler configuration.

While the invention has been described in detail, the foregoing description is in all aspects illustrative and not restrictive. It is therefore understood that numerous modifications and variations can be devised without departing from the scope of the invention.

The invention claimed is:

1. A state quantity detection method in a power converting apparatus comprising:
   a plurality of input lines to which a multi-phase voltage is inputted;
   first and second DC power supply lines; and
   a current-source converter including a plurality of high-arm side switching elements and a plurality of low-arm side switching elements, each of said high-arm side switching elements being connected between each of said input lines and said first DC power supply line, each of said low-arm side switching elements being connected between each of said input lines and said second DC power supply line,
   wherein, based on an instantaneous conduction pattern of said high-arm side switching elements and said low-arm side switching elements, a voltage between said first and second DC power supply lines is detected as a line voltage between said input lines.

2. The state quantity detection method in the power converting apparatus according to claim 1, wherein
   said power converting apparatus further comprises:
   a plurality of output lines; and a voltage-source inverter including a plurality of second high-arm side switching elements and a plurality of second low-arm side switching elements, each of said second high-arm side switching elements being connected between each of said output lines and said first DC power supply line, each of said second low-arm side switching elements being connected between each of said output lines and said second DC power supply line, said power converting apparatus is a direct power converting apparatus in which power storage means is not provided in said first and second DC power supply lines, said current-source converter and said voltage-source inverter are operated in synchronization with each other, and a current flowing in said first and second DC power supply lines is detected as a line current of said output line, based on a second instantaneous conduction pattern of said second high-arm side switching elements and said second low-arm side switching elements.

3. The state quantity detection method in the power converting apparatus according to claim 2, wherein
said power converting apparatus further comprises:
a carrier generation section that generates a carrier;
a converter gate signal generation section that gives a first switch signal for controlling a switching operation of said high-arm side switching elements and said low-arm side switching elements; and
an inverter gate signal generation section that gives a second switch signal for controlling a switching operation of said second high-arm side switching elements and said second low-arm side switching elements,
said current-source converter performs a commutation based on said first switch signal, when a value of said carrier is a reference value for dividing a range between a minimum value and a maximum value of said carrier at a ratio between a first value and a second value,
said voltage-source inverter adopts said second conduction pattern based on said second switch signal, in each of two cycles of a first carrier cycle and a second carrier cycle which are alternately recognized with a boundary therebetween being at a time point at which said carrier has said reference value,
said current is detected as said line current, based on said second instantaneous conduction pattern in a longer one of said first carrier cycle and said second carrier cycle.

4. The state quantity detection method in the power converting apparatus according to claim 3, wherein
said plurality of said output lines are three output lines,
in one cycle of said carrier, said current is detected to detect two of line currents of said output lines, and the other one of said line currents is calculated based on said detected two line currents.

5. The state quantity detection method in the power converting apparatus according to claim 2, wherein
said power converting apparatus further comprises:
a carrier generation section that generates a carrier having a single triangular wave shape; and
a converter gate signal generation section that gives a switch signal for controlling a switching operation of said high-arm side switching elements and said low-arm side switching elements,
said current-source converter performs a commutation based on said switch signal, when a value of said carrier is a reference value for dividing between a minimum value and a maximum value of said carrier at a ratio between a first value and a second value,
when the value of said carrier is the maximum value or the minimum value, said voltage is sampled/held, and detected.

6. The state quantity detection method in the power converting apparatus according to claim 2, wherein
said detected line current is converted into a current value in mutually orthogonal α-axis and β-axis of a stationary coordinate system, or into a current value in mutually orthogonal d-axis and q-axis in a rotating coordinate system.

7. The state quantity detection method in the power converting apparatus according to claim 2, wherein
said plurality of said input lines are three input lines,
said power converting apparatus further comprises:
a carrier generation section that generates a carrier; and
a converter gate signal generation section that gives a switch signal for controlling a switching operation of said high-arm side switching elements and said low-arm side switching elements,
said current-source converter performs a commutation based on said switch signal, when a value of said carrier is a reference value for dividing between a minimum value and a maximum value of said carrier at a ratio between a first value and a second value,
in one cycle of said carrier, said voltage is detected to detect two of line voltages between ones of said input lines, and the other one of said line voltages is calculated based on said detected two line voltages.

8. The state quantity detection method in the power converting apparatus according to claim 1, wherein
said power converting apparatus further comprises:
a carrier generation section that generates a carrier having a single triangular wave shape; and
a converter gate signal generation section that gives a switch signal for controlling a switching operation of said high-arm side switching elements and said low-arm side switching elements,
said current-source converter performs commutation based on said switch signal, when a value of said carrier is a reference value for dividing a range between a minimum value and a maximum value of said carrier at a ratio between a first value and a second value,
when the value of said carrier is the maximum value or the minimum value, said voltage is sampled/held, and detected.

9. The state quantity detection method in the power converting apparatus according to claim 1, wherein
said detected line voltage is converted into a voltage value in mutually orthogonal α-axis and β-axis of a stationary coordinate system, or into a voltage value in mutually orthogonal d-axis and q-axis in a rotating coordinate system.

10. The state quantity detection method in the power converting apparatus according to claim 1, wherein
said plurality of said input lines are three input lines,
said power converting apparatus further comprises:
a carrier generation section that generates a carrier; and
a converter gate signal generation section that gives a switch signal for controlling a switching operation of said high-arm side switching elements and said low-arm side switching elements,
said current-source converter performs a commutation based on said switch signal, when a value of said carrier is a reference value for dividing a range between a minimum value and a maximum value of said carrier at a ratio between a first value and a second value, in one cycle of said carrier, said voltage is detected to detect two of line voltages between ones of said input lines, and the other one of said line voltages is calculated based on said detected two line voltages.

11. A power converting apparatus comprising:
a plurality of input lines to which a multi-phase voltage is inputted;
first and second DC power supply lines;
a current-source converter including a plurality of high-arm side switching elements and a plurality of low-arm side switching elements, each of said high-arm side switching elements being connected between each of said input lines and said first DC power supply line, each of said low-arm side switching elements being connected between each of said input lines and said second DC power supply line; and
a line voltage detection section that detects a voltage between said first and second DC power supply lines as a line voltage between said input lines, based on an instantaneous conduction pattern of said high-arm side switching elements and said low-arm side switching elements.

12. The power converting apparatus according to claim 11, further comprising:
a plurality of output lines;
a voltage-source inverter including a plurality of second high-arm side switching elements and a plurality of second low-arm side switching elements, each of said second high-arm side switching elements being connected between each of said output lines and said first DC power supply line, each of said second low-arm side switching elements being connected between each of said output lines and said second DC power supply line;
a synchronization modulation section that operates said current-source converter and said voltage-source inverter in synchronization with each other; and
a line current detection section that detects a current flowing in said first and second DC power supply lines as a line current of said output line, based on a second conduction pattern of said second high-arm side switching elements and said second low-arm side switching elements,
wherein said power converting apparatus is a direct power converting apparatus in which power storage means is not provided in said first and second DC power supply lines.

13. The power converting apparatus according to claim 12, wherein
said synchronization modulation section comprises:
a carrier generation section that generates a carrier;
a converter gate signal generation section that gives a first switch signal for controlling a switching operation of said high-arm side switching elements and said low-arm side switching elements; and
an inverter gate signal generation section that gives a second switch signal for controlling a switching operation of said second high-arm side switching elements and said second low-arm side switching elements,
said current-source converter performs a commutation based on said first switch signal, when a value of said carrier is a reference value for dividing a range between a minimum value and a maximum value of said carrier at a ratio between a first value and a second value,
said voltage-source inverter adopts said second conduction pattern based on said second switch signal, in each of two cycles of a first carrier cycle and a second carrier cycle which are alternately recognized with a boundary therebetween being at a time point at which said carrier has said reference value,
said line current detection section detects said current as said line current, based on said second instantaneous conduction pattern in a longer one of said first carrier cycle and said second carrier cycle.

14. The power converting apparatus according to claim 13, wherein
said plurality of said output lines are three output lines,
in one cycle of said carrier, said line current detection section detects said current to detect two of line currents of said output lines, and calculates the other one of said line currents based on said detected two line currents.

15. The power converting apparatus according to claim 12, further comprising:
a carrier generation section that generates a carrier having a single triangular wave shape; and
a converter gate signal generation section that gives a switch signal for controlling a switching operation of said high-arm side switching elements and said low-arm side switching elements,
wherein
said current-source converter performs a commutation based on said switch signal, when a value of said carrier is a reference value for dividing between a minimum value and a maximum value of said carrier at a ratio between a first value and a second value,
said line voltage detection section samples/holds and detects said voltage, when the value of said carrier is the maximum value or the minimum value.

16. The power converting apparatus according to claim 12, wherein
said line current detection section converts said line current into a current value in mutually orthogonal α-axis and β-axis of a stationary coordinate system, or into a current value in mutually orthogonal d-axis and q-axis in a rotating coordinate system.

17. The power converting apparatus according to claim 12, wherein
said plurality of said input lines are three input lines,
said power converting apparatus further comprises:
a carrier generation section that generates a carrier; and
a converter gate signal generation section that gives a switch signal for controlling a switching operation of said high-arm side switching elements and said low-arm side switching elements,
said current-source converter performs a commutation, when a value of said carrier is a reference value for dividing between a minimum value and a maximum value of said carrier at a ratio between a first value and a second value,
in one cycle of said carrier, said line voltage detection section detects said voltage to detect two of line voltages between ones of said input lines, and calculates the other one of said line voltages based on said detected two line voltages.

18. The power converting apparatus according to claim 11, further comprising:
a carrier generation section that generates a carrier having a single triangular wave shape; and
a converter gate signal generation section that gives a switch signal for controlling a switching operation of said high-arm side switching elements and said low-arm side switching elements, wherein said current-source converter performs a commutation on said switch signal, when a value of said carrier is a reference value for dividing a range between a minimum value and a maximum value of said carrier at a ratio between a first value and a second value, said line voltage detection section samples/holds and detects said voltage, when the value of said carrier is the maximum value or the minimum value.

19. The power converting apparatus according to claim 11, wherein said line voltage detection section converts said line voltage into a voltage value in mutually orthogonal α-axis and β-axis of a stationary coordinate system, or into a voltage value in mutually orthogonal d-axis and q-axis in a rotating coordinate system.

20. The power converting apparatus according to claim 11, wherein said plurality of said input lines are three input lines, said power converting apparatus further comprises:

a carrier generation section that generates a carrier; and a converter gate signal generation section that gives a switch signal for controlling a switching operation of said high-arm side switching elements and said low-arm side switching elements, said current-source converter performs a commutation, when a value of said carrier is a reference value for dividing a range between a minimum value and a maximum value of said carrier at a ratio between a first value and a second value, in one cycle of said carrier, said line voltage detection section detects said voltage to detect two of line voltages between ones of said input lines, and calculates the other one of said line voltages based on said detected two line voltages.

* * * * *